(12) United States Patent
Abraham

(10) Patent No.: US 8,149,897 B2
(45) Date of Patent: Apr. 3, 2012

(54) METHOD AND APPARATUS FOR PERFORMING SIGNAL CORRELATION FOR SIGNALS RECEIVED FROM SATELLITES IN MULTIPLE SATELLITE SYSTEMS

(75) Inventor: Charles Abraham, Los Gatos, CA (US)

(73) Assignee: Global Locate, Inc., Irvine, CA (US)

( * ) Notice: Subject to any disclaimer, the term of this patent is extended or adjusted under 35 U.S.C. 154(b) by 1415 days.

(21) Appl. No.: 11/441,798

(22) Filed: May 26, 2006

(65) Prior Publication Data
US 2007/0274374 A1 Nov. 29, 2007

(51) Int. Cl.
H04B 1/00 (2006.01)
H03D 1/00 (2006.01)
H04N 5/00 (2011.01)
(52) U.S. Cl. ............... 375/148; 375/343; 348/611
(58) Field of Classification Search ............ 375/148, 375/343; 348/611
See application file for complete search history.

(56) References Cited

U.S. PATENT DOCUMENTS

| | | | | |
|---|---|---|---|---|
| 4,426,712 A | * | 1/1984 | Gorski-Popiel | 375/343 |
| 4,894,842 A | * | 1/1990 | Broekhoven et al. | 375/150 |
| 5,923,287 A | | 7/1999 | Lennen | |
| 6,044,107 A | * | 3/2000 | Gatherer et al. | 375/222 |
| 6,067,319 A | * | 5/2000 | Copeland | 375/232 |
| 6,072,994 A | * | 6/2000 | Phillips et al. | 455/84 |
| 6,091,932 A | * | 7/2000 | Langlais | 725/111 |
| 6,240,133 B1 | * | 5/2001 | Sommer et al. | 375/232 |
| 6,795,771 B2 | | 9/2004 | Fuchs | |
| 6,922,167 B2 | * | 7/2005 | Gerein | 342/357.74 |
| 2002/0051087 A1 | * | 5/2002 | Limberg et al. | 348/611 |
| 2005/0270997 A1 | | 12/2005 | Julien et al. | |

FOREIGN PATENT DOCUMENTS

| | | |
|---|---|---|
| KR | 1020010030317 | 4/2001 |
| KR | 1020010073136 | 7/2001 |
| KR | 1020020083725 | 11/2002 |
| WO | WO2005040845 | 5/2005 |

OTHER PUBLICATIONS

Schmid A et al., "Enabling Location Based Services with a Combined Galileo/GPS Receiver Architecture," ION GNSS 17th International Technical Meeting of the Satellite Division, Long Beach, CA, USA, Sep. 21, 2004, pp. 1468-1479, XP002525428.

Jung H et al., "Design and Practical Implementation of Multifrequency RF Front Ends Using Direct RF Sampling," IEEE Transactions on Microwave Theory and Techniques, IEEE Service Center, Piscataway, NJ, US, vol. 53, No. 10, Oct. 1, 2005, pp. 3082-3089, XP011140283, ISSN: 0018-9480, DOI: DOI:10.1109/TMTT.2005.855127.

(Continued)

Primary Examiner — David C. Payne
Assistant Examiner — Sarah Hassan
(74) Attorney, Agent, or Firm — Sterne, Kessler, Goldstein & Fox PLLC

(57) ABSTRACT

A method and apparatus for computing a convolution between a satellite signal from one of a plurality of satellite positioning systems and a pseudorandom code reference. The method and apparatus is capable of operating in multiple modes of resolution so as to enhance the sensitivity of the convolution processing.

20 Claims, 14 Drawing Sheets

OTHER PUBLICATIONS

Kappen G et al., "Application Specific Instruction Processor Based Implementation of a GNSS Receiver on an FPGA," Design, Automation and Test in Europe, 2006, Date '06, Proceedings Munich, Germany Mar. 6-10, 2006, Piscataway, NJ, USA, IEEE, vol. 2, Mar. 6, 2006, pp. 1-6, XP010929514, ISBN: 978-3-9810801-1-7.

EPO Communication dated Dec. 21, 2010 in Application No. 07835776.1-2220 / 2030040.

International Search Report corresponding to International Application No. PCT/US2007/012635, mailed Feb. 27, 2008, 4 pages.

Written Opinion of the International Searching Authority, corresponding to International Application No. PCT/US2007/012635, mailed Feb. 27, 2008, 7 pages.

"L1 band part of Galileo Signal in Space ICD (SIS ICD)", Program: Galileo; Copyright © 2005 by Galileo Joint Undertaking,1-30.

Betz, John W., et al., "DirAc: An Integrated Circuit for Direct Acquisition of the M-Code Signal".

Burian, Adina, et al., "Filter Design Considerations for Acquisition of BOC-modulated Galileo Signals".

Gerein, Neil et al., "NovAtel's Galileo Test Receiver", *Proc of ION GNSS 2005*, Long Beach, California (Sep. 13-16, 2005), 1-7.

Heinrich, Gunter, et al., "HIGAPS a Highly Integrated Galileo/GPS Chipset for Consumer Applications", *GPS World*, Sep. 2004, 38-47.

Heinrichs, Guenter, et al., "A Hybrid Galileo/W-CDMA Receiver Architecture for Mass-Market Applications".

Heinrichs, Guenter, et al., "HIGAPS—A Large-Scale Integrated Combined Galileo/GPS Chipset for the Consumer Market".

Hollreiser, Martin, "Galileo Receivers—Challenges and Performance", *12th GAAS® Symposium*—Amsterdam (2004), 515-518.

Julien, Olivier, "Design of Galileo L1F Receiver Tracking Loops", *University of Calgary, Department of GeoMatics Engineering, UCGE Reports*, No. 20227, Thesis (Jul. 2005), i-325.

Lohan, Elena S., "Statistical analysis of BPSK-like techniques for the acquisition of Galileo signals", 1-9.

Mattos, Philip G., "A Single-Chip GPS Receiver and the Steps to Mass-Market Galileo", *GPS World* (Oct. 1, 2005),1-6.

* cited by examiner

METHOD AND APPARATUS FOR PERFORMING SIGNAL CORRELATION FOR SIGNALS RECEIVED FROM SATELLITES IN MULTIPLE SATELLITE SYSTEMS

BACKGROUND OF THE INVENTION

1. Field of the Invention

The present invention relates to signal correlators for digital signal receivers and, more particularly, the invention relates to a method and apparatus for performing signal correlation for signals received from satellites in multiple satellite systems, for example, a global positioning system (GPS) satellite and a Galileo satellite.

2. Description of the Background Art

A Global Satellite Navigation System (GNSS) has been contemplated to utilize satellite signals from both Global Positioning System (GPS) satellites and Galileo System satellites to facilitate position location using signals from satellites in either system. However, satellite signal receivers are generally designed to receive signals from satellites in one satellite system, e.g., the Global Positioning System or Galileo, but not both. As such, the receiver must wait for at least four GPS satellites to be visible and provide strong enough signals to enable the satellite signal receiver to acquire the signals. The constellation of 24 GPS satellites is generally sufficient for users to determine there position in an open area, i.e., 4 to 8 satellites will generally be visible to the receiver. However, when a GPS receiver is operating in an area where trees, mountains or buildings occlude the view of the sky, the receiver may not determine an accurate position, or may not function at all.

To enable a GNSS receiver to receive satellite signals at low signal levels, assistance information is sent to the receiver to enable the receiver to acquire and track the signals. Such assistance information may include satellite orbit information, timing synchronization information, Doppler frequency information, and the like. A GNSS receiver generally contains a correlation circuit that locates and tracks a correlation peak of a received satellite signal. The assistance information is used to assist the correlator circuitry in identifying an appropriate code phase and frequency estimate to use to acquire and track the satellite signal.

Since each GNSS system uses a different modulation technique, the correlator circuits differ between a Galileo receiver and a GPS receiver. For example, a GPS satellite transmits a pseudorandom-noise (PRN) modulated signal that uses a repeating 1023 chip code in a 1 mS epoch, while Galileo uses a 4092 chip code in a 4 mS epoch, but also adds a Binary Offset Carrier (BOC) code that "spreads" the signal to twice the bandwidth of a GPS signal, i.e., the 4092 bit PRN code is modulated with a binary signal at twice the rate of the PRN code.

Due to these signal differences, receivers of GPS and Galileo signals are not compatible. As such, to produce an accurate position, a receiver designed for a single satellite system must have sufficient signal strength from four satellites within that satellite system. In certain situations, this is not possible and a receiver will fail to compute a position or will require a very long time to compute a position. Alternatively, the receiver would have correlator circuitry dedicated to each satellite system; thus approximately doubling the size of the circuitry within the receiver.

Thus, there is a need for an improved, satellite signal receiver that acquires signals from satellites in multiple satellite systems using common correlator circuits.

SUMMARY OF THE INVENTION

The invention provides a method and apparatus for correlating satellite signals that are received from multiple satellite systems. The method and apparatus provides a plurality of channels, where each channel is capable of receiving and processing a satellite signal from a plurality of satellite systems. In one embodiment, each channel can receive signals from both GPS satellites and/or Galileo satellites. Using a partial correlation technique, the correlator in each channel computes a full convolution between an input signal (e.g., either a GPS or Galileo signal) and a pseudorandom noise (PRN) code reference.

DESCRIPTION OF DRAWINGS

The invention can be readily understood by considering the following detailed description in conjunction with the accompanying drawings, where.

DETAILED DESCRIPTION

Figure 1:
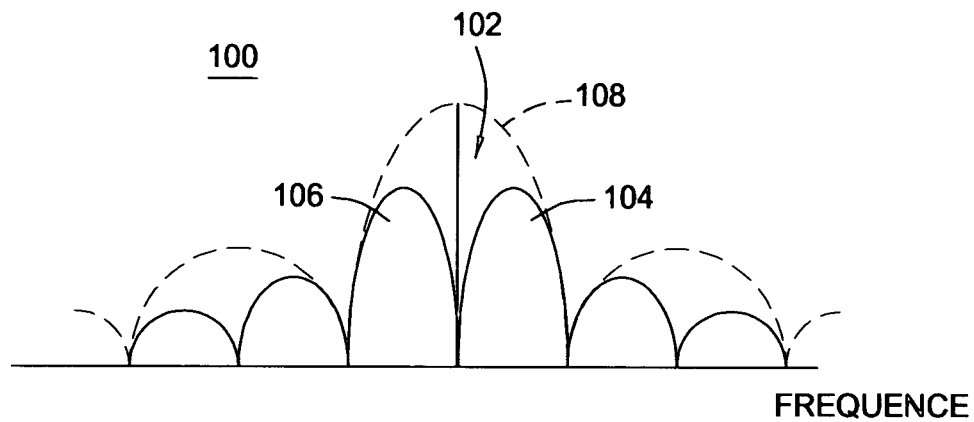
FIG. 1 is a graph of a frequency spectrum of a BOC modulated pseudorandom noise signal that forms a Galileo satellite signal.

There are many differences between GPS and Galileo signals that must be handled by a GNSS receiver. First, a Binary Offset Carrier (BOC) code is used by Galileo, but not by GPS. A BOC code is a binary signal having a rate double the PRN code rate that remodulates the signal to form a double lobed signal having a null at the center frequency of a GPS signal spectrum. Each lobe has a bandwidth similar to that of a GPS signal. To enable the correlation circuits of a dual system GNSS receiver to process both Galileo and GPS signals, this BOC code must be removed or compensated. Galileo uses an L1F signal (an L1 band RF signal) carrying two sub-channels (L1B and L1C components). The L1B sub-channel carries a data component (using a BOC modulated 4096 chip spreading code to transmit 250 symbol per second navigation data)

and the L1C sub-channel carries a pilot component (using a BOC modulated 4096 chip spreading code to transmit 25 bits/epoch secondary code). In the final Galileo system design, the secondary code may not be used. The receiver 100 may tune to either of these sub-channels or process both of them. The repeating Galileo PRN code of both sub-channels is four times as long as the GPS code, i.e., 4096 chips repeating every 4 mSec versus 1023 chips repeating every 1 mSec. The codes used in each sub-channel are different. The Galileo PRN code is currently undefined, such that, the receiver must have a mechanism for updating the code that is to be used.

One other aspect of the Galileo signal should be noted. The data has a bit length equal to the length of one epoch of the Galileo PRN code. As such, a bit may invert the code after each epoch, which limits the coherent integration period for a Galileo signal to one epoch. To achieve a longer coherent integration period, the impact of the data upon correlation of the PRN code needs to be addressed (the process is known as "data wiping"). Once the data impact is removed, multiple epochs of PRN code can be coherently integrated using a correlator. Furthermore, if this secondary code is used, it must be removed from the pilot channel in the same manner that the data is addressed (wiped). The data and secondary code are synchronized with each other and with the PRN code epochs, i.e., as with the data, the secondary signal also has a bit duration that is the same as the length of an epoch. As such, without wiping the secondary code, the coherence length is limited to one epoch.

FIG. 1 is a graph 100 of a frequency spectrum 102 of a BOC modulated pseudorandom noise (PRN) signal such as the signal transmitted by a Galileo satellite. The spectrum 102 has two main side lobes, an upper sideband (USB) 104 and a lower sideband (LSB) 106. The dashed spectrum 108 represents frequency spectrum of a signal transmitted by a GPS satellite.

Figure 2:
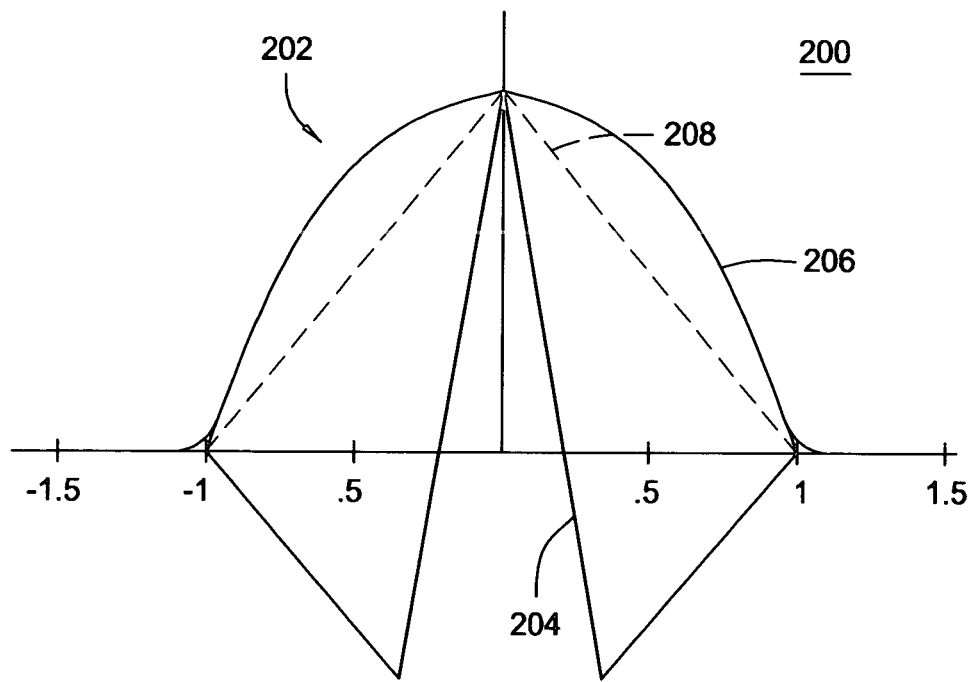
FIG. 2 is a graph of an autocorrelation function of a Galileo signal using a full correlation compared to an autocorrelation function generated by a "filtered" Galileo signal.

FIG. 2 is a graph 200 an autocorrelation functions (ACF) 202 for a Galileo satellite signal. Function 202 represents the ACF 204 of the entire signal, while function 206 represents the ACF of the USB only (or LSB only), i.e., an ACF of a "filtered" Galileo signal. For comparison purposes, the dashed ACF 208 of a GPS signal is presented. The unfiltered Galileo signal has an AFC 204 that is much narrower (in time), e.g., about +/−0.4 chips, which requires a finer spacing of correlations than used for correlating a GPS signal having a width of +/−1.0 chip. By filtering the Galileo signal, the correlation response becomes similar to a GPS signal and permits the correlation spacing to be the same for receiving GPS signals and Galileo signals.

In one embodiment of the invention, the dual system GNSS receiver of the present invention utilizes the entire signal (ACF 204), in an alternative embodiment, the receiver processes only one sideband (ACF 204) and, in a further embodiment, the GNSS receiver may utilize the single sideband for signal acquisition and the full signal during signal tracking. In all instances, the GNSS receiver of the present invention uses common correlation circuits for processing both GPS and Galileo signals. Each of the embodiments of the GNSS receiver is discussed below.

The present invention utilizes various solutions for each of the GPS/Galileo signal differences to enable a single GNSS receiver to process both Galileo and GPS signals. The first issue, the BOC code, is handled by either by filtering the Galileo signal to generate the USB, LSB or both prior to correlation, or correlates the entire Galileo signal. The correlation can be performed on the data component, the pilot component or both. The second issue, the code length, is handled by running the correlation circuit at least four times faster than when GPS signals are processed, assuming only USB or LSB signals are processed. Alternatively, the receiver may operate at the same speed as when processing a GPS signal, but correlate for only one-fourth of the possible delay lags of a Galileo signal. The third issue, the undefined PRN code, is handled by using random access memory to store the PRN code for the Galileo signals. As such, a change in the code requires a mere change or updating of memory. Such updates can be accomplished via download rather than actually changing the physical memory.

Figure 3:
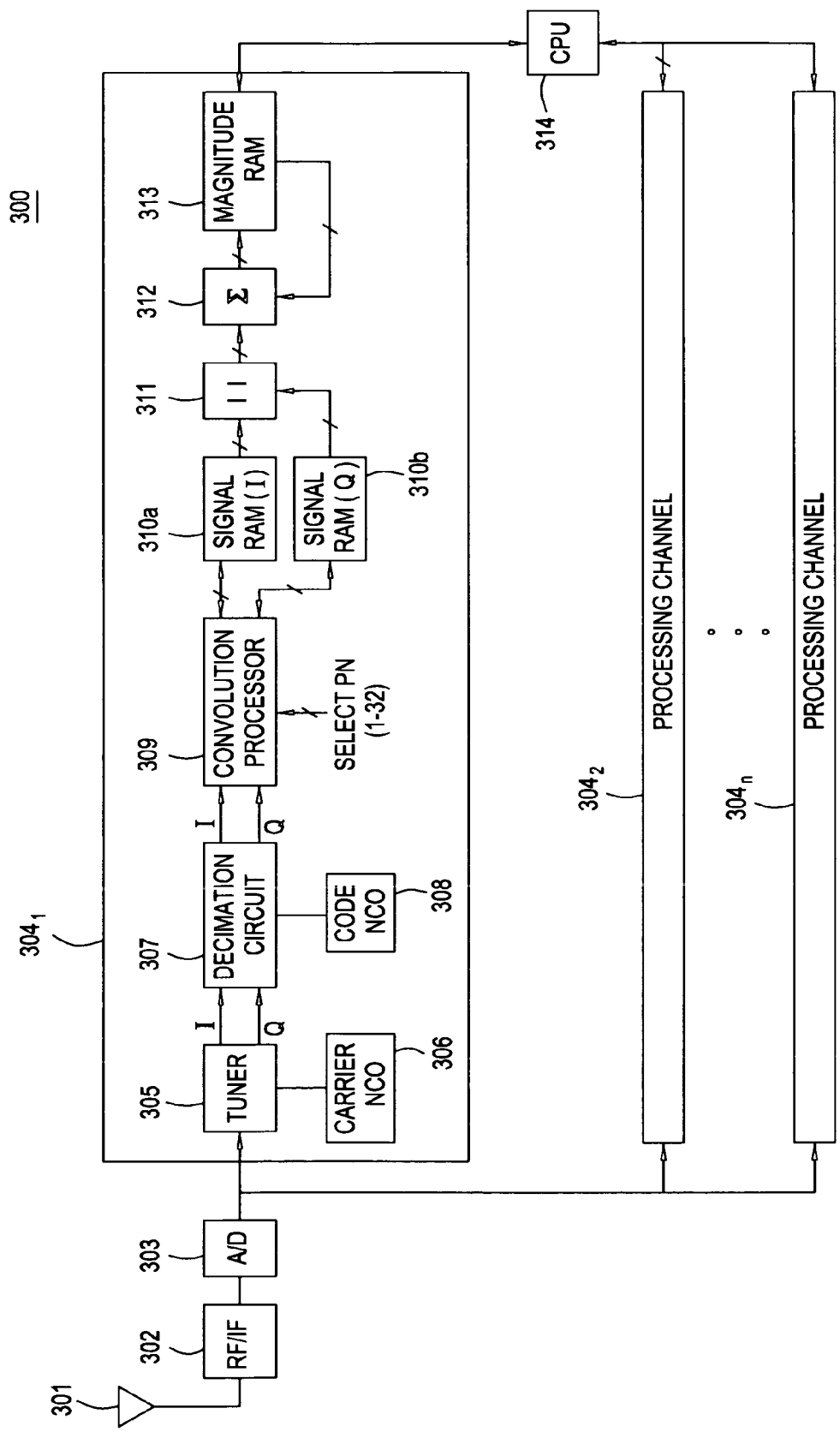
FIG. 3 shows a block diagram of a GPS receiver comprising the present invention.

FIG. 3 depicts a block diagram of a dual system Global Navigation Satellite System (GNSS) receiver 300 incorporating the present invention. The use of a GNSS receiver as the platform within which the invention is incorporated forms one application of the invention. Other platforms that require signal correlation from two different systems may find use for the present invention.

In one embodiment of the invention, the GNSS receiver 300 receives and processes satellite signals from at least two different satellite positioning systems. For example, within each channel of the receiver; signals from at least one GPS satellite and/or at least one Galileo satellite can be processed using common circuitry.

Signals (such as GPS and/or Galileo signals) are received by an antenna 301. A radio-frequency-to-intermediate-frequency converter (RF/IF converter) 302 filters, amplifies, and frequency shifts the signal for digitization by an analog-to-digital converter (A/D) 303. The elements 301, 302 and 303 are substantially similar to those elements used in a conventional GPS or Galileo receiver; however, the RF bandwidth of the system should be approximately doubled to allow for the increased spectral occupation of the BOC modulated Galileo signal.

Continuing with the description of FIG. 3, the output of the A/D 303 is coupled to a set of processing channels $304_1$, $304_2$, ... $304_n$ (where n is an integer) implemented in digital logic. Each processing channel $304_n$ is capable of processing a signal from either a GPS or Galileo satellite. The signal in a particular channel is tuned digitally by a tuner 305, driven by a numerically controlled oscillator (NCO) 306.

Figure 4:
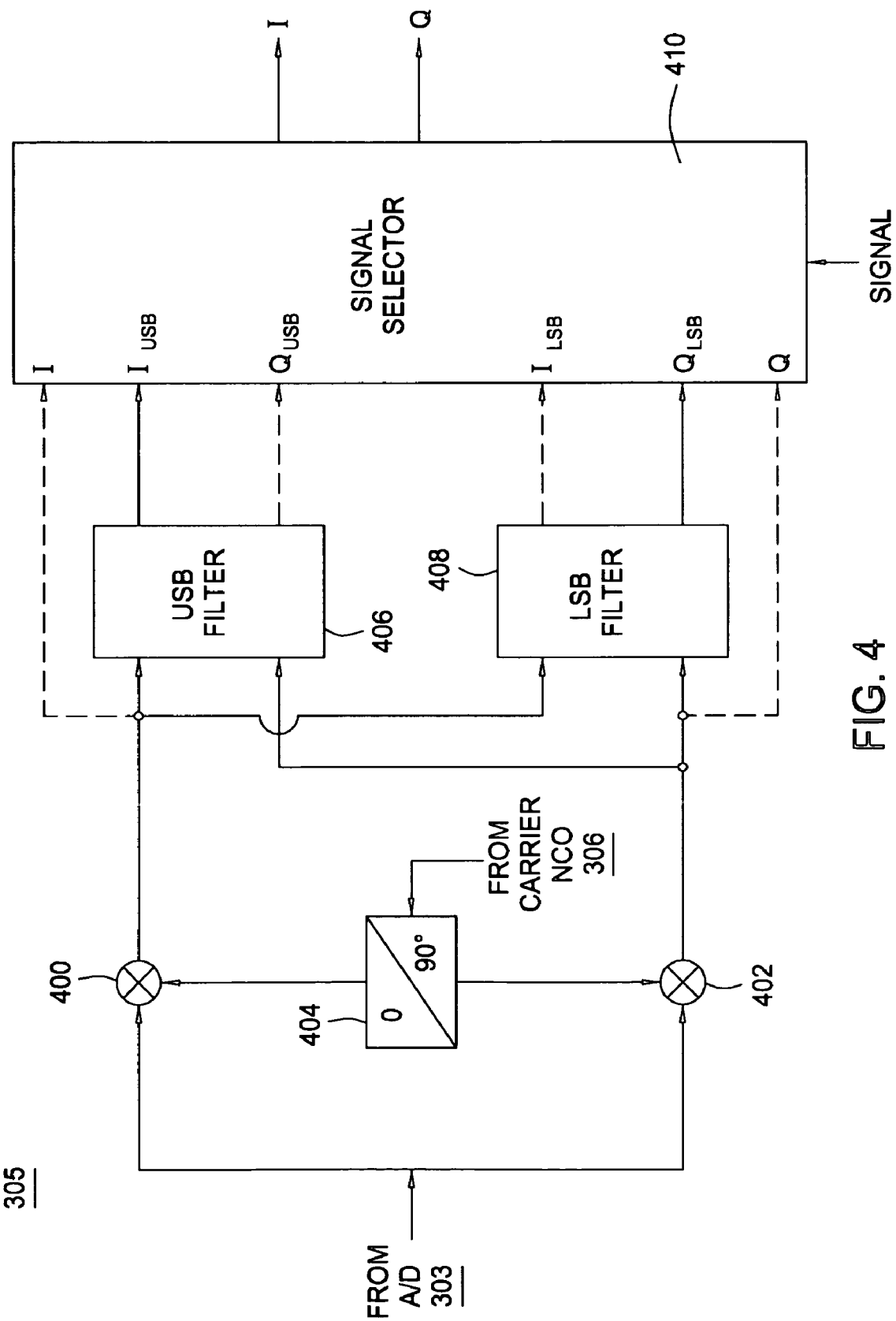
FIG. 4 depicts a tuner used for receiving both GPS and Galileo signals.

FIG. 4 depicts a block diagram of the tuner 305 that is capable of processing Galileo and GPS signals. The tuner comprises a pair of mixers 400 and 402, a quadrature splitter 404, a pair of filters 406 and 408 and a signal selector 410 (e.g., a 6:2 multiplexer or two 3:1 multiplexers). In operation, the NCO signal is coupled to the splitter 404 such that a 0 degree phase shifted NCO signal is applied to the mixer 400 and a 90 degree phase shifted signal is applied to the mixer 402. The result of the NCO signal being mixed with the digitized satellite signal is an in-phase component (I) and a quadrature component (Q). These I and Q components may be filtered or unfiltered. In one embodiment of the invention, the USB filter 406 are used to select the USB portion ($I_{USB}$, $Q_{USB}$) of the BOC modulated PRN signal for further processing. Alternatively, the LSB filters 410 and 412 could be used to select the LSB portion ($I_{LSB}$, $Q_{LSB}$) of the signal for further processing. In a final embodiment, no filtering is performed and the I and Q components form the outputs of the tuner 305. When GPS signals are to be received, no filtering is applied and the signals are taken as the unfiltered I and Q signals. The signal selector 414 is used to select which of the signals is to be used as the tuner output.

The tuner 305 primarily serves two purposes. First, the IF frequency component remaining after RF/IF conversion is removed. Second, the satellite Doppler frequency shift resulting from satellite motion, user motion, and reference frequency errors is removed. In an assisted satellite positioning system receiver, the receiver is provided an almanac and/or ephemeris for both GPS and Galileo satellites. As such, the receiver 300 can determine the satellites that are in view of the receiver. Consequently, an estimate of the Doppler shift may be available such that an initial Doppler value can be estimated. Even if a Doppler estimate is not available, knowing which GPS and Galileo satellites are in view enables the receiver to allocate appropriate channels to receive either GPS or Galileo satellites that are known to be in view. If the receiver has no assistance information, then the receiver channels perform a blind search for GPS satellites and then for Galileo satellites, or vice versa.

The USB filter 406 (or LSB filter 408) is a complex filter that is centered upon the upper lobe 104 of the spectrum 102. By filtering one sideband, the USB signal is a "BPSK-like" signal that can be processed (e.g., correlated) in the same manner as a GPS signal. The result of using one sideband is approximately 3 dB loss in signal strength as well as a slight "rounding" of the correlation function, see FIG. 2, ACF 206 and a 2-chip wide base to the correlation function.

Once a signal is received using a correct frequency, the output from the tuner 305 is a baseband signal consisting of an in-phase component (I) and a quadrature component (Q). As mentioned above, these components may be filtered or not. With this filtering in the tuner to create a BPSK-like signal, the correlator circuits within the processing channels can be used for either GPS or Galileo signals. The unfiltered Galileo signals, when selected, are not BPSK-like and required different processing than the GPS signals. In some instances, as shall be discussed below, using the unfiltered Galileo signals is beneficial. Although the selector 410 is shown as selecting amongst three complex signals, in a practical receiver, the tuner will create one side band or the other. As such, the tuner would, for example, have a USB filter 406 only, i.e., LSB 408 is not necessary. In this arrangement, using the selector 410, the I and Q signals are selected when GPS signals are to be processed and the $I_{USB}$ and $Q_{USB}$ signals are selected when processing Galileo signals. If unfiltered Galileo signals are to be processed, the selector 410 selects the I and Q signals while the receiver is tuned to a channel carrying Galileo signals. The selector 410 is controlled by the CPU 314. In one embodiment of the invention, the selector 410 would select between the complex USB Galileo signal or the complex GPS signal.

Returning to FIG. 3, a decimation circuit 307 processes the output of the tuner 305. The output of the decimation circuit 307 is a series of complex signal samples with I and Q components, output at a rate precisely timed to match the timing of the input signal. In one embodiment of the invention, the decimation operation is a simple pre-summer that sums all the incoming signal samples over the period of an output sample. A numerically controlled oscillator (NCO) 308 is used to time the sampling process. For example, if P=2, the code NCO 308 is set to generate a frequency of ($2 \times f_s$), where $f_s$ is $f_o$ (the GPS/GALILEO signal's PRN code chipping rate), adjusted for Doppler shift. Note that if the unfiltered Galileo signal (having a narrow autocorrelation function) is to be processed, the value of P is minimally 4. The NCO adjusts for Doppler shift based on external input from firmware commands. Because the Doppler shift is different for each satellite, a separate code NCO 308 and decimation circuit 307 is required for each channel $304_n$. It should be noted that there is no requirement that the incoming sample rate be an integer multiple of the $f_s$, as the code NCO 308 is capable of generating an arbitrary frequency. If the decimation circuit 307 is a pre-summer, the number of samples summed will typically toggle between two values, so that over the long term, the correct sample timing is maintained. For example, if the incoming sample rate is 10 MHz, and the desired sample rate is 2.046 MHz, the pre-summer will add either 4 or 5 samples, so that the desired sample rate is maintained on average.

The decimation circuit 307 may also include a quantizer (not shown) at its output to reduce the number of bits in the signal components before further processing. In one embodiment of the invention, 2-bit quantization is used.

The signal samples from the decimation circuit 307 are coupled to a convolution processor 309. The convolution processor 309 performs a partial correlation process (as described below) on the I and Q components of the unfiltered Galileo signal, the I and Q components of the upper or lower sideband of the Galileo signal or the I and Q components of a GPS signal. When correlating Galileo signals, the correlation can be performed upon the pilot component, the data component or both. The convolution processor 309 generates partial correlation results that are accumulated in signal random access memories (RAMs) 310a and 310b. Specifically, these RAMs 310a and 310b hold a complex vector that makes up all or part of the full convolution between the input signal and a reference PRN code (e.g., a GPS PRN code, Galileo PRN code or Galileo pilot code). The convolution result will have a peak at points corresponding to high correlation between the signal and reference. As shall be discussed in detail below, the relative location of these peaks for various satellite signals is used to ultimately compute position information.

The convolution processor 309 and signal RAMs 310a and 310b accumulate convolution results for multiple epochs of the GPS signal, which repeats at nominal 1 millisecond intervals. For example, if 10 milliseconds of the signal are processed, the values in RAM 310a and 310b are the sum of many GPS correlation results (partial correlations) generated over at least one GPS epoch. With Galileo signals having a 4 msec long epoch, 4 milliseconds of signal create correlation results over one Galileo epoch. All the individual correlations should have a similar characteristic, since the timing of the decimation operation ensures that samples are taken at the same relative moment within each epoch. Accumulating similar results from individual correlations improves the signal to noise ratio, enhancing the ability of the receiver to detect weak signals. This processing may be referred to as coherent integration and, as will be discussed, can be combined with magnitude integration to yield correlation results averaged over a time period of up to several seconds.

The length of time over which coherent integration interval is performed is limited by several factors, including uncompensated Doppler shift, satellite signal navigation data bits, and phase shifts induced by motion of the receiver 300. These factors introduce slow, but seemingly random phase variations into the signals. Over many tens of milliseconds, these phase changes cause destructive interference that defeats the purpose of coherent integration. Therefore, to achieve long averaging intervals, the receiver 300 performs a secondary step of magnitude accumulation. Specifically, the signals stored in the signal RAMs 310a and 310b are periodically output to a complex normalizer 311 that generates a complex magnitude value of the complex convolution vector. The complex magnitude values are accumulated by an adder 312 and stored in magnitude RAM 313. Each time the complex magnitude of the signal is computed, the signal RAMs 310a and 310b are cleared to allow another coherent integration to occur. The process continues until the desired number of magnitude accumulations is completed. For example, when correlating GPS signals, if the coherent averaging interval is 10 milliseconds, and 200 magnitude accumulations are desired, the total process will run over 2 seconds. For Galileo signals, one-fourth of the magnitude accumulations are used over the 2 second period.

With Galileo signals, as mentioned above, the L1B sub-channel contains a data signal that periodically inverts the L1B PRN code during an epoch and the L1C sub-channel may contain a secondary code that periodically inverts the L1C PRN code during an epoch. Such inversion limits the coherent integration period to only 4 mS. As such, to have a coherent integration period of longer than an epoch, the data and secondary code need to be removed from the signal. Although such removal may be performed at any point in the signal processing, a convenient location is after correlation and before the coherent integration is performed. To remove the data or secondary code, the correlation result is multiplied by a removal signal, e.g., properly timed +1 or a −1. The sequence of values used to remove the secondary code is an a-priori known code that is stored in memory. The sequence to remove the data After convolution processing, the magnitude RAM 313 contains a vector containing the complex magnitude of the convolution result, integrated to improve signal-to-noise ratio. As shall be discussed below, this vector is further processed by software algorithms that are executed by the CPU 314 to produce pseudorange data that is used to yield the position of the receiver. It should be noted that the CPU computational load for these steps is quite modest compared to a conventional software tracking loop signal receiver or an FFT based correlator. In this implementation, the computationally intensive tasks of correlation and integration are completed prior to software processing.

Figure 5:
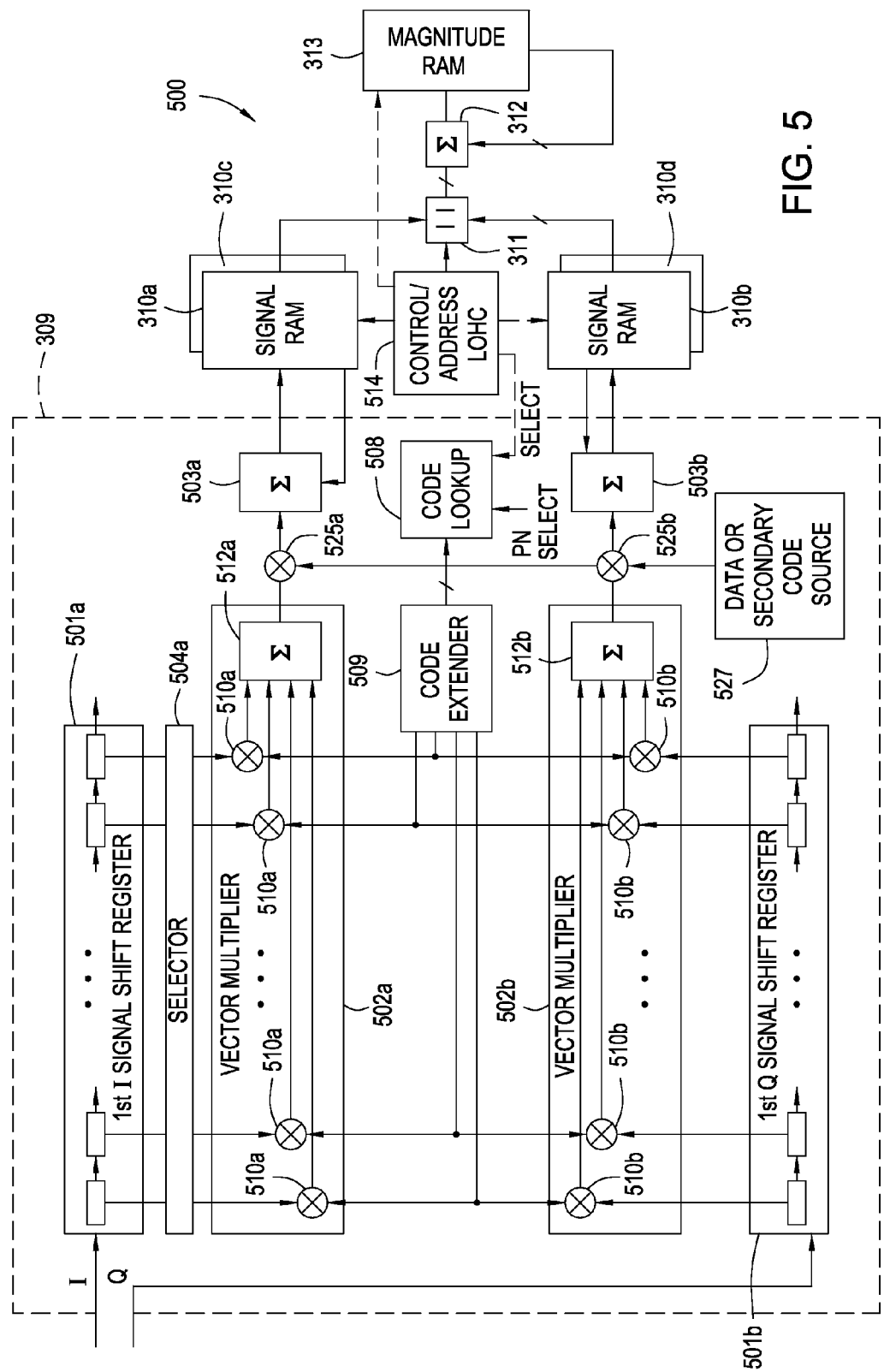
FIG. 5 shows an example of waveforms produced by the invention of FIG. 1 when receiving GPS signals.
Figure 6A:
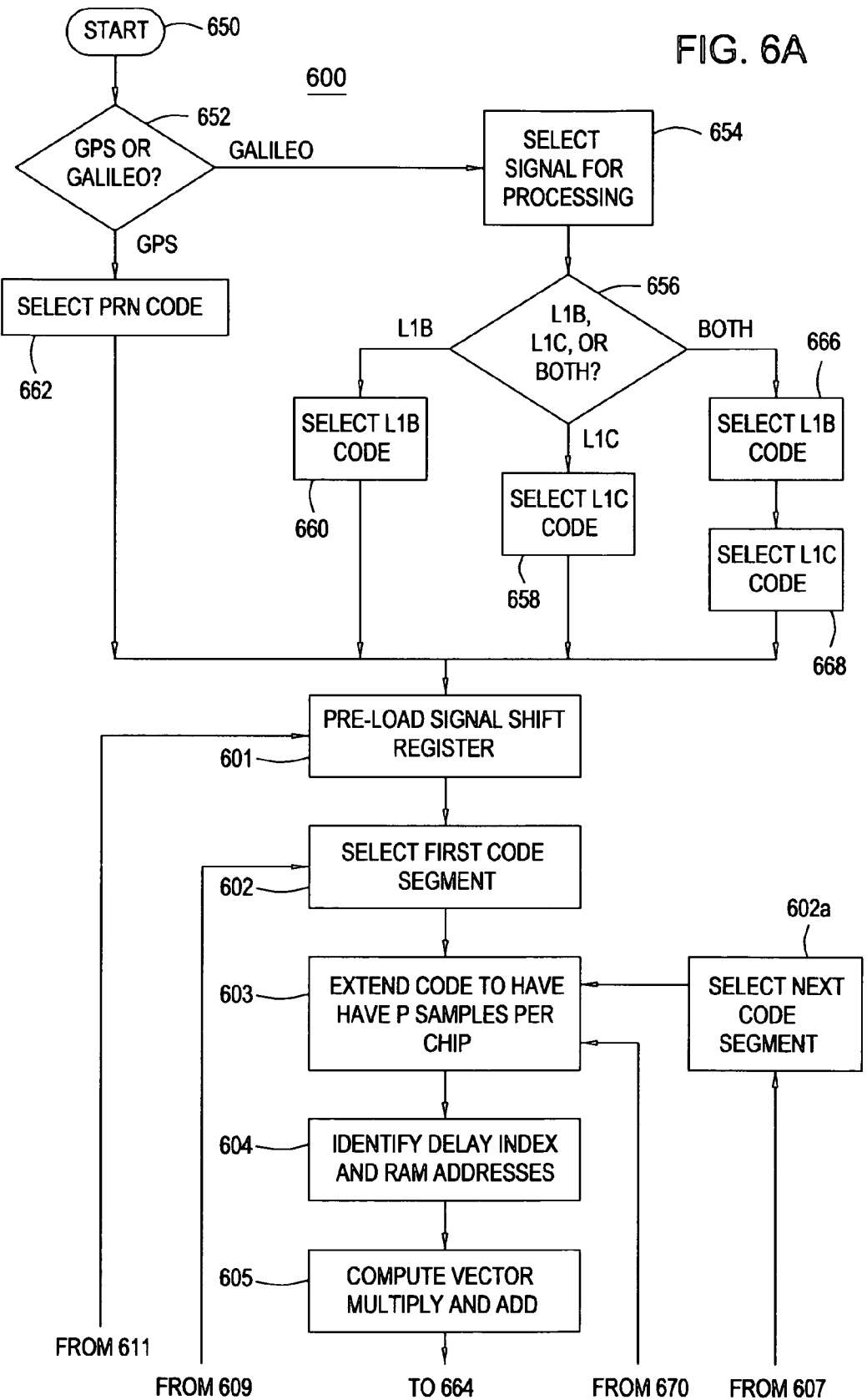
FIGS. 6A and 6B together depict a flow diagram of a method of operation of the invention of FIG. 3.
Figure 6B:
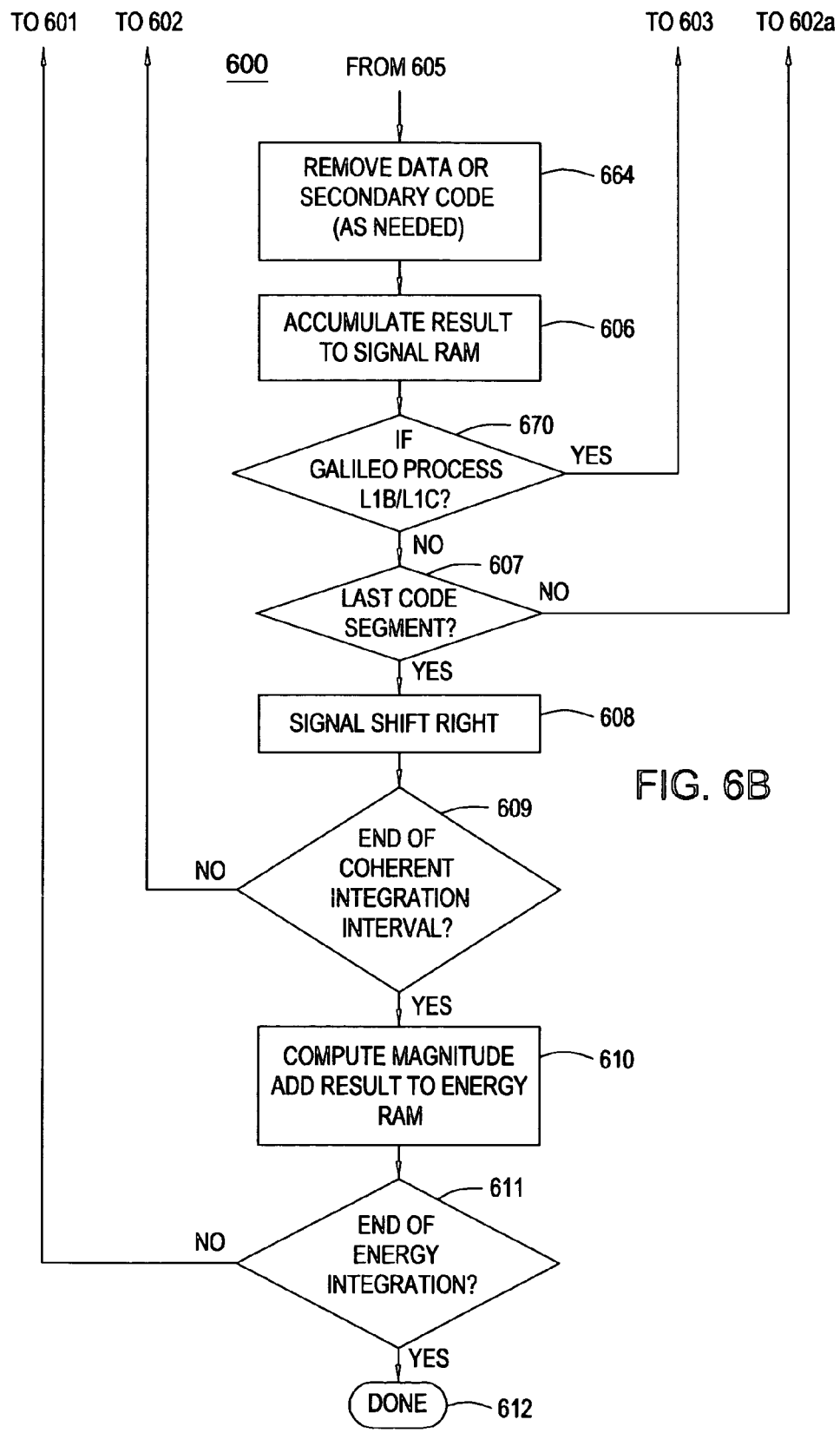

FIG. 5 depicts a detailed block diagram of the convolution processor 309 (as well as the convolution results processing circuits 500), in particular details showing how a full convolution is generated by repeated use of a small block of circuitry. Operation of the circuits in this embodiment can be best understood with simultaneous reference to FIG. 5, a flow diagram of FIG. 6 representing the operation of the processor 309 of FIG. 5, and by comparison of the simple examples of FIG. 7 and FIG. 8.

Although the present invention may be implemented by parallel correlating an appropriately selected reference code with either a portion or the entire GPS signal or the filtered Galileo signal, the description below focuses upon the use of a partial correlator. Those skilled in the art will realize from the following discussion that the partial correlator could be adapted to correlate the received signals to produce a full convolution for either Galileo signals or GPS signals without accumulating partial correlations.

Signals from the decimation circuit 307 are coupled to shift registers 501a and 501b handling I and Q components, respectively. Each shift register 501a and 501b is of length P×K, where P is the desired number of samples per code chip, and K is chosen as a design parameter. As will be explained K is a factor of 1023. A variable M defines the total number of partial correlations that are performed to generate a full convolution using K length correlations. To simplify the discussion, the remainder of the discussion focuses on one particular embodiment with P=2 (samples spaced ½ chip apart), K=33 and M=31 to process either GPS signals. However, since the Galileo epoch is four times the length of a GPS epoch, the processing speed for processing Galileo signals would have to be run four times as fast as used for GPS signals and maintain P=2 and K=33, (i.e., M=124 for filtered Galileo signals). If the number of samples processed at any one time in the correlator is doubled (K=66), then the processing speed Galileo signals is only double the GPS processing speed. In the embodiment discussed below, the correlator has 132 taps (P×K taps) and uses a clock speed that is double the speed necessary for processing GPS signals. In this embodiment, the GPS signal is correlated using half the available taps (K=33). Those skilled in the art will understand that the number of taps may be varied depending upon the clock speed that is used, i.e., the shorter the correlator, the more times a correlation will need to be performed and the faster the clock speed that is necessary to ensure that an entire epoch of GPS and Galileo signals can be correlated.

If the Galileo signals are unfiltered where the correlation function is less than one chip wide, then P=4, K=33 and M=124, and the correlator uses 132 taps and the clock will run at eight times the speed of the clock during GPS signal correlation. This means of advancing the signal through the shift register eliminates the need for circuitry to double-buffer the signal, reducing the cost and complexity of implementation. The shift registers 501a and 501b are used to correlate the I and Q signals of the GPS signal as well as the $I_{USB}$ and $Q_{USB}$ (or the $I_{LSB}$ and $Q_{LSB}$) of the filtered Galileo signals.

When processing Galileo signals, the convolution processor 309 must be capable of correlating both L1B (data) and L1C (pilot) PRN codes. In one embodiment of the invention, when processing Galileo signals, the shift registers 501a and 501b store the sampled signals and the PRN codes for the L1B signal (data channel) and the PRN code for the L1C signal (pilot channel) are supplied in a multiplexed manner. Thus, while the samples are held in the registers, as discussed in detail below, both PRN codes are correlated with the samples at all possible time delays. To correlate both L1B and L1C signals, the clock speed must be doubled to ensure that all the delays for both L1B and L1C are correlated before the next sample of signal is applied to the registers 501a and 501b.

Signals advance through shift registers 501a and 501b at the rate of P×$f_o$ (e.g., $2f_o$), as timed by the code NCO 308. The signals remain in place in the shift registers for many clock cycles, so that a series of partial correlation operations can be performed. Specifically, a total of M partial correlations are performed, where M=1023/K or 31 in this example for GPS signals or M=4096/K or 124 for each of the filtered L1B and L1C Galileo signals. Four times as many partial correlations are formed for an unfiltered Galileo signal. Each partial correlation consists of a fast vector multiply and add operation between the contents of each signal shift register and a segment of the code containing P×K (e.g., 132) code samples. The fast vector multiplication and addition occurs in circuits 502a and 502b. Circuits 502a and 502b respectively comprise multipliers 510a and 510b and summers 512a and 512b. The operation consists of multiplying each of the 132 signal samples in the signal register 501a or 501b by 132 code samples (formed by extending 33 code samples with the code extender 509), and summing the results in summer 512a and 512b. For Galileo signals, all 132 taps are used during each vector multiplication and, for GPS signals, half the taps are used during each vector multiplication. The operation occurs separately and simultaneously in the I and Q channels. Mathematically, this operation is referred to as an inner product, defined as $$\sum_{i=1}^{P \times K} <signal_i> \cdot <code\ c_i>$$

The output of the vector multiply and add may be re-quantized to keep the numbers in a small range so as to avoid overflowing RAMs 504a and 504b. For simplicity, the quantizer is not shown. In one embodiment, the re-quantization is to 2 bits of resolution.

For GPS signals, the 66 code samples comprise 33 unique code samples and 33 code sample duplicates. Thus, for each unique code sample, a duplicate is used to double the number of code samples. For unfiltered Galileo signals, the 33 unique samples are extended to four samples with two samples of a first polarity followed by two samples of reverse polarity. Thus, each unique sample is followed by a sample having an opposite polarity. For filtered Galileo signals, 66 samples of code are extended to 132 samples.

The results of the vector multiply and add are accumulated by adders 503a and 503b and processed by the convolution results processing circuits 500. Circuits 500 comprise signal RAM 310a, 310b, complex normalizer 311, adder 312 and magnitude RAM 313. The accumulation process consists of reading from RAM 310a and 310b the current values for a particular time delay, adding the just computed partial correlations, and writing the sums back to RAMs 310a and 310b. By properly combining partial correlations that correspond to a particular time delay, the full correlation for that delay is computed. As described previously, the process continues for as many epochs of the signal as desired to enhance signal to noise ratio. Thus, the adders 503a and 503b serve two purposes: the combining of partial correlations within an epoch; and the accumulation of correlations across several epochs.

When correlating Galileo signals, a selection is first made with regard to the signal type that is to be correlated: USB signal, LSB signal, and unfiltered signal, and then a selection of the signal component that is to be correlated is selected: the pilot component (L1C) or data component (L1B) in each signal type. Each of these signals can be coherently correlated separately using the partial correlation process and have the individual correlations accumulated in signal RAMs 310a, 310b, 310c and 310d. Generally, only the USB or LSB signals would be processed. At a minimum, one of these signals is correlated, e.g., an L1C USB signal; however, six signal type and component combinations may be correlated by multiplexing the use of the vector multipliers 502a and 502b (or having multiple registers and/or multipliers operating in parallel) and selecting different code portions for correlation at appropriate times. Alternatively, a different convolution processor 309 could be used by each signal component. Generally, for GPS signals, the RAMS 310a and 310b are used to accumulate results produced by the GPS signal correlation process. For Galileo signals, both the L1B and L1C sub-channel signals may be correlated. In that case, the signal RAMs are divided into two portions 310a, and 310c as well as 310b and 310d. The L1B and L1C results are accumulated separately into the individual RAM partitions. In this manner, each signal is separately accumulated. If only L1B or L1C is used, then only RAMs 310a and 310b are used.

Since the Galileo signal contains data on the L1B sub-channel and/or a secondary code on the L1C sub-channel that inverts the signal phase after each PRN code epoch (i.e., a 4 mS period), the correlation interval is only 4mS unless the data and or secondary code is removed. This removal, if desired, is performed by a pair of multipliers 525a and 525b that are driven with either a data code or a secondary code, depending upon whether the pilot or data channels are being correlated. The code source 527 outputs a +1 or −1 for the duration of an epoch. The secondary code is known a-priori and can be stored in memory. The data is not known and must be derived by the CPU 314 from a previously received satellite navigation message or from assistance data received from the network. In either case, once the data or secondary code is "wiped", the correlation interval can be extended such that many epochs of data can be correlated to improve the receiver sensitivity. If a secondary code is not used (which is one possible implementation of Galileo), then the L1C sub-channel could be used for signal acquisition because of the long correlation interval.

The outputs from signal RAMs 310a, 310b, 310c and 310d are combined in complex normalizer 311 to form the magnitude of the signal. The I and Q waveforms in these RAMs 310a, 310b, 310c and 310d can be viewed as the real and imaginary part of a complex waveform. Forming the magnitude consists of squaring each component, summing the results, and taking the square root of the result. There are several approximations to the magnitude that can be used to simplify circuitry. In one embodiment, the complex magnitude is approximated by taking the scalar magnitude of I and Q independently and determining which is larger. The magnitude can be approximated by taking the larger magnitude and adding it to the one half of the smaller magnitude.

For Galileo signals, the coherent correlations of up to nine different signal correlations can be accessed in the signal RAMS 310a, 310b and non-coherently summed to form an input to the normalizer 311. The various correlations results may be selectively combined, e.g., L1B correlation s alone, L1B and L1C correlations combined, filtered signals correlations combined with unfiltered signal correlations and so on.

The results of the magnitude operation may be scaled to keep the values in a small range so as to avoid overflowing RAM 313. For simplicity, a scaler is not shown. In one embodiment, the scaling consists of shifting the result by 3 bits (i.e., divide by 8).

It would also be possible to accumulate signal powers rather than signal magnitudes. In this case, the operation in circuit 500 would be power estimation, typically computed by taking the sum of the squares of I and Q. Alternatively, additional nonlinear operations could be used to generate values representative of the magnitude or power of I and Q.

The output from complex normalizer 311 is accumulated by the adder 312 into magnitude RAM 313. The accumulation process consists of reading from RAM 313 the current magnitude value for a particular time delay, adding in the just computed magnitude result, and writing the sum back to the RAM 313. As discussed previously, the magnitude accumulation continues for as many cycles as required to achieve signal to noise ratio enhancement.

The vector multipliers 502a and 502b perform M partial correlations for each shift of the signal. A code lookup circuit 508 generates the reference code samples for each partial correlation. The lookup is controlled by two lookup indexes. First, the GPS code must be selected from 1 of 32 codes. This selection is constant through the convolution process and is established when the processing channel is configured to correlate for a particular satellite signal. The second index is a segment index between 1 and M. Each GPS code consists of 1023 chips, which are divided into M non-overlapping segments each consisting of K adjacent code chips. The lookup index identifies which code segment is needed. The output from the code lookup circuit is K chips comprising the segment. The selection process is controlled by Control/Address Logic 514. For Galileo signals, the code consists of 4096 chips, which are divided into M non-overlapping segments each consisting of K adjacent code chips. The Galileo code segment for both the L1B and L1C sub-channels is looked up in the same manner as used for the GPS code segment, i.e., using a code and segment index.

For GPS, the PRN is a known code (1023 chip Gold code) that can be generated as needed and stored in the lookup table 408. For Galileo, the code is a so-called "memory code" that is not specified in advance and may not be mathematically generated. As such, the 4092 chips will be supplied by the Galileo specification and will be stored in memory for loading into the code lookup 508.

The code extender 509 takes as its input K chips of a segment and extends the segment into K×P code samples. Depending upon whether a GPS signal is being processed or a Galileo signal is being processed, the code extender uses a specific technique. For GPS signals and filtered Galileo signals, the extension operation consists of converting each code chip into P identical code samples. For unfiltered Galileo signals, where P=4, the extension operation consists of using a two positive and two inverted code samples. The output from the code extender 509 forms the reference code input to vector multipliers 502*a-b*. In the example, the output from the code extender is 66 samples made up of 33 unique GPS or filtered Galileo chip values, each replicated twice, or 132 samples comprising unique unfiltered Galileo chip values, each replicated with an additional positive value and two inverted values.

The architecture shown in FIG. 5 requires a clock that is substantially faster than the PRN code rate $f_o$. For example, if two samples per PRN code chip are used (P=2) and K and M are to be 33 and 31 respectively, achieving the full convolution requires performing 31 partial correlations for each shift of the signal shift register, which advances at rate $2 \times f_o$. Typically, at least one clock cycle is required to read and write RAMs 110*a* and 110*b*. Assuming one clock cycle the minimum clocking rate required to achieve the full convolution is:

$$f_{clk} = 1 \times 31 \times 2 \times f_o = 1 \times 31 \times 2 \times 1.023 \text{ MHz} \approx 63.5 \text{ MHz}$$

This rate is easily achievable in modern integrated circuit logic.

For a filtered Galileo signal, the clocking rate is two times the GPS clocking rate to ensure that the entire four milliseconds of signal are processed in the same amount of time as GPS signal processing. For unfiltered the clocking rate is four times the GPS clocking rate to ensure that four milliseconds of signal are processed and to accommodate the need to increase P from 2 to 4.

It should be noted that the invention could also be used to compute a subset of the full convolution. This is particularly important when processing Galileo signals at a clocking rate less than eight times the GPS correlator clocking rate. In this case, fewer than M partial correlations are performed for each shift of the signal shift register. In this case, the total range of delays will be less than the P×1023 making up a full convolution. In particular if $M_2$ partial correlations are performed, then $M_2$ times K times P delay values are generated. The clocking rate to the processor is reduced by the ratio of $M_2$ to M. Furthermore, the size of the RAMs is reduced by this ratio as well. Thus, this alternative may be useful in systems that do not have the computation or memory resources to process the full convolution.

In one embodiment of the invention, correlating Galileo signals is performed using the same clocking rate and partial correlations as used with GPS signals. As such, only one-fourth of an epoch is correlated at any one time. To ensure that the correlation is performed using timing that creates a correlation peak in the one-fourth of an epoch that is correlated, the GNSS receiver may first acquire a signal form a GPS satellite to establish accurate timing for the receiver, then acquire the Galileo signal using the timing estimate from acquisition of the GPS signal. Since, initially, there will be many more GPS satellites than Galileo satellites, there is a high probability that the timing for the receiver will be established by signals from a GPS satellite before a Galileo signal will be received.

Alternatively, Galileo signal acquisition may be performed on the pilot component, then the data component may be acquired. The secondary code (if any) that is expected to be used as part of the pilot component is known, and is easily removed to enable a longer correlation interval for the L1C sub-channel. Once satellite timing is known, then the L1B sub-channel signal can be correlated using the shorter (4 mS) correlation interval without wiping the data. Alternatively, a GPS signal may be acquired using its long correlation interval and, after timing synchronization is achieved, the Galileo signals may be achieved using the shorter (4 mS) correlation interval of either sub-channel without wiping either data or secondary code from the sub-channels.

Other choices for K and M allow further design tradeoffs to be made, however, since the prime factors of 1023 are 3, 11, and 31, the choices for K and M are limited. Reducing K is desirable since this reduces the size of the shift registers 501*a* and 501*b* and the complexity of the vector multipliers 502*a* and 502*b*, but requires a larger M and therefore a large clocking rate. The choices for K are 3, 11, 31, 33, 93. These choices would require clocking rates of 695 MHz, 190 MHz, 67.5 MHz, 63.5 MHz, and 22.5 MHz respectively (always assuming P=2 and 1 clock cycle per partial correlation.) Based on the technology available at the time of the demonstration, the K=66 choice was made for one embodiment. With future technologies, the choice of K=11 and a clock rate of 190 MHz may become viable and would result in a further reduction of the logic complexity. Thus, the architecture has the desirable attribute of supporting optimized tradeoffs between speed and logic complexity.

The sequencing of code segments is controlled by control logic 514. This control logic also identifies the correct addresses for the RAMs 310*a*, 310*b* and 313. As will be discussed below, the partial correlations are generated in a non-sequential order, thus the generation of RAM addresses is non-trivial.

The operation of the circuits of FIG. 5 can also be understood by reference to the flow diagram of FIG. 6. The method 600 begins at step 650 and proceeds to step 652 where the method selects whether the processing channel is to process Galileo or GPS signals. If the method 600 selects Galileo signals, the method 600 proceeds to step 654. At step 654, the method detects the signal to be processed, i.e., filtered or unfiltered. At step 656, the method determines which sub-channel (L1B or L1C) or both are to be processed. If L1B only is to be processed, then at step 650, the L1B PRN code is selected for use. If L1C only is to be processed, then at step 658, an L1C PRN code is selected for use. If both L1B and L1C are to be processed, then the method 600 selects an L1B PRN code at step 666 and an L1C PRN code at step 668. Although the depicted embodiment may select the signals to be correlated, a simple embodiment may only correlate on of the Galileo sub-channels, i.e., L1C. In such an embodiment, steps 654, 656, 660, 666, and 668 would not be utilized and the embodiment would select the L1C code at step 658.

If a GPS signal is to be processed, as selected in step 652, the method 600 selects a GPS PRN code at step 662.

At step 601, the method 600 begins pre-loading of the signal shift registers 501*a* and 501*b*. At this point, convolution processing can begin. At step 602, a code segment or segments of the selected PRN codes are accessed for a particular partial correlation.

At step 603, the code segment is extended by the code extender to have P samples per PRN chip. As discussed above, for unfiltered Galileo signals, switched polarity chip code is used and, for GPS, a duplicate chip code is used. If the Galileo signal is filtered, then the Galileo signal code is extended in the same manner as the GPS code.

Next, at step 604, the delay index and corresponding RAM addresses are computed. The delay index indicates which point of the full convolution will be updated by the partial correlation. As will be apparent from the example discussed in conjunction with FIG. 8, the delay index jumps around in a non-linear, but deterministic manner. The address computation is a function of the number of signal shifts and the code segment.

At step 605, the partial correlation is computed using the vector multipliers 502a and 502b. At step 664, the data or secondary code is removed, as needed. At step 606, the result of the vector multiply is accumulated into the signal RAMs at the location indicated by the delay index At step 670, the method 600 queries whether both L1B and L1C sub-channels are being correlated. If both the I1B and L1C sub-channel signals are being processed the method proceeds to step 603, then steps 603, 604, 605, 664, and 606 are repeated for the L1B code and then for the L1C code, or vice versa. Next at step 607, a check is made to determine whether the processing has reached the end of the coherent integration interval. If not, the method returns back to step 602, and repeats for the above steps for the next code segment.

If, at step 607, the check indicates that partial correlations are complete for all code segments (e.g., M partial correlations), the method proceeds to step 608. At step 608, the signal registers 501a, 501b, 501c and 501d are shifted by one sample.

The method 600 then moves to step 609, where a check is performed to see if the last shift encountered the end of the coherent integration interval. If not, the process cycles back to step 602. If the check indicates the end of the coherent integration interval, then the method continues to step 610, where the signal magnitude is computed by complex normalizer 311. The result is added using adder 312 and stored in the magnitude RAM 313. Next, at step 611, a check is made to determine if all magnitude accumulations have been performed. If so, the method completes at step 612. If not, processing continues by performing the next partial correlation at step 601.

Figure 7:
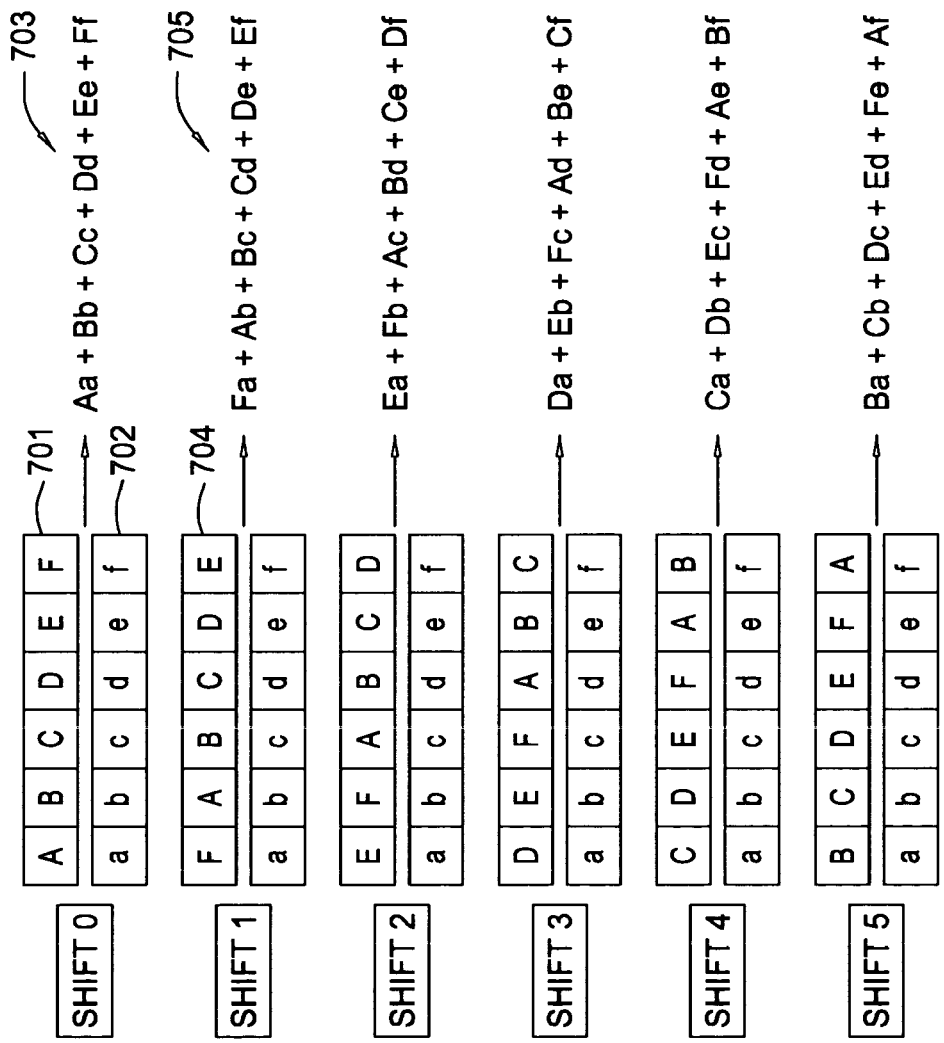
FIG. 7 graphically illustrates a simplified example of computing a full convolution in the traditional manner.
Figure 8:
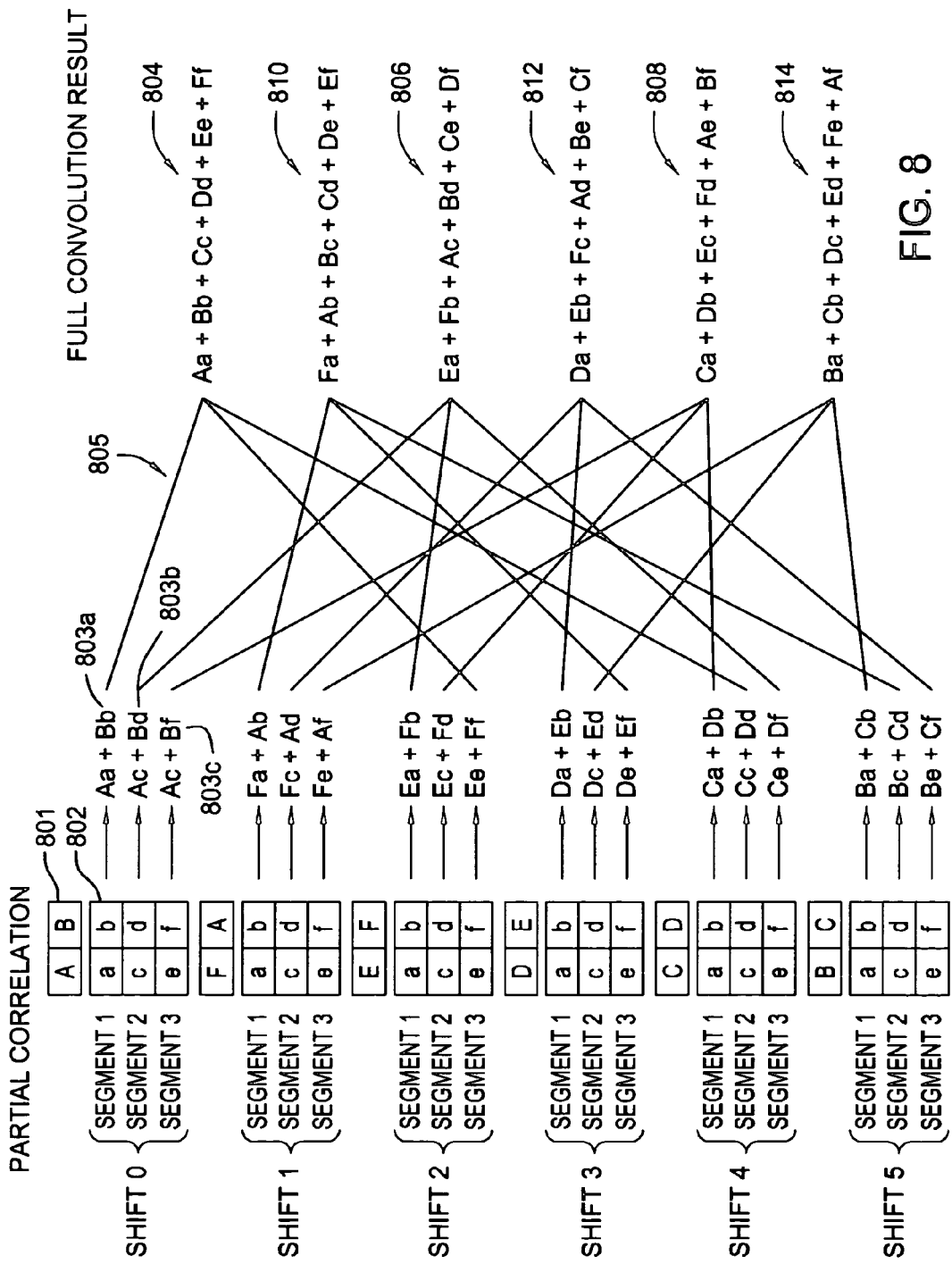
FIG. 8 graphically illustrates how the full convolution is performed using the invention.

FIG. 7 and FIG. 8 illustrate, through a simplified example, how the invention utilizes partial correlations to accumulate a full convolution result. For clarity, these diagrams illustrate convolution of a very short length 6 code, as opposed to the length 1023 GPS PRN code or 4092 Galileo PRN code of a satellite signal. To further simplify the example, one sample per code chip is used, i.e., P=1. FIG. 7 illustrates convolution through a standard matched filtering approach, and FIG. 8 illustrates the identical convolution through the method of combining of partial correlations. The details of FIG. 8 are helpful in understanding overall operation of the invention. Both methods generate identical convolution results.

FIG. 7 shows the operation of a conventional matched filter for a length 6 signal. Operation begins at a moment in time indicated as shift 0. At this moment, 6 consecutive signal samples comprising an entire cycle of the signal are in the signal shift register 701. Individual samples are labeled with uppercase indices A, B, C, D, E, and F. Code samples for the entire length 6 code are held in reference register 702 and are labeled with lowercase indices a, b, c, d, e, and f. At the time of shift 0, a vector multiplication and add is performed to generate the correlation result for shift 0. Each signal sample is multiplied by a corresponding code sample and the results are summed to yield correlation result 703.

Next, the signal shift register 704 is advanced by one sample, as indicated by shift 1. The signal is periodic, so the new sample introduced at the left side of the register is identical to that shifted out to the right. The shifted contents of the register 704 are now samples with indices F, A, B, C, D, and E. The code is not shifted. The vector multiplication and addition now yields a correlation result 705 for shift 1. This process of shifting continues for 5 additional shifts, at which point all 6 correlation results making up the full convolution are available.

FIG. 8 illustrates how the same convolution result can be obtained through the method of partial correlations. As described, the invention requires that the code be factored into M segments of length K. In the simplified example of FIG. 8, the length 6 code was factored into 3 segments of length 2, i.e. K=2 and M=3. Operation begins at a moment in time indicated at shift 0. At this moment, two signal samples are held in the signal shift register 801. The signal samples are labeled with uppercase indices A and B. The 6 samples of the code are contained in 3 segments each of length 2. The first code segment 802 contains 2 code samples labeled with lowercase indices a and b. The signal is held in place for 3 partial correlation operations, resulting in partial correlation results 803a, 803b and 803c. The first partial correlation result is created by a vector multiplication and addition between the contents of the signal register and the first code segment (segment 1). The second and third results are created by vector multiplications of the signal register with the second and third code segments respectively. Note that the signal register is held in place for a sufficient time for all three-vector multiplications to be performed, and that the code is not shifted during this time, rather different code segments are selected.

The partial correlation results are accumulated into the memory according to the signal paths 805. For example, at shift 0, the partial correlation from the first code segment sums into the correlation result 804. The partial correlation from the second segment sums into the correlation result 806 for shift 2. The partial correlation from the third segment contributes to the correlation result 808 for shift 4.

After three partial correlations, the signal is shifted. At this stage, indicated as shift 1, the signal register contains samples F and A. Again, three partial correlations are generated with the same three code segments as before. The results from these partial correlations contribute to correlation results 810, 812, 814 respectively for shifts 1, 3, and 5. The process continues for 4 additional signal shifts, at which time the full convolution result is available. As can be seen, the operation requires generating a total of 18 partial correlations that contribute to the 6 full results comprising the convolution.

The architecture described by FIG. 8 illustrates two important properties of the invention. First, it is apparent that the full convolution was produced for a length 6 code using only a shift register and vector multiplication and addition unit of length 2. This requires less circuitry than the FIG. 7 where these elements are of length 6. Second, in FIG. 8, the code samples are accessed in fixed segments that are the same for each shift, and each segment is a separate non-overlapping section of the code. Thus, a simple lookup or register technique can be used to provide the code to the vector multipliers, as will be discussed further in reference to FIG. 9 and FIG. 10. These techniques require less circuitry than other architectures that might, for example, require large blocks of code bits to be made available in a more complex set of permutations. The invention also eliminates the need to provide code generation circuitry.

Figure 9:
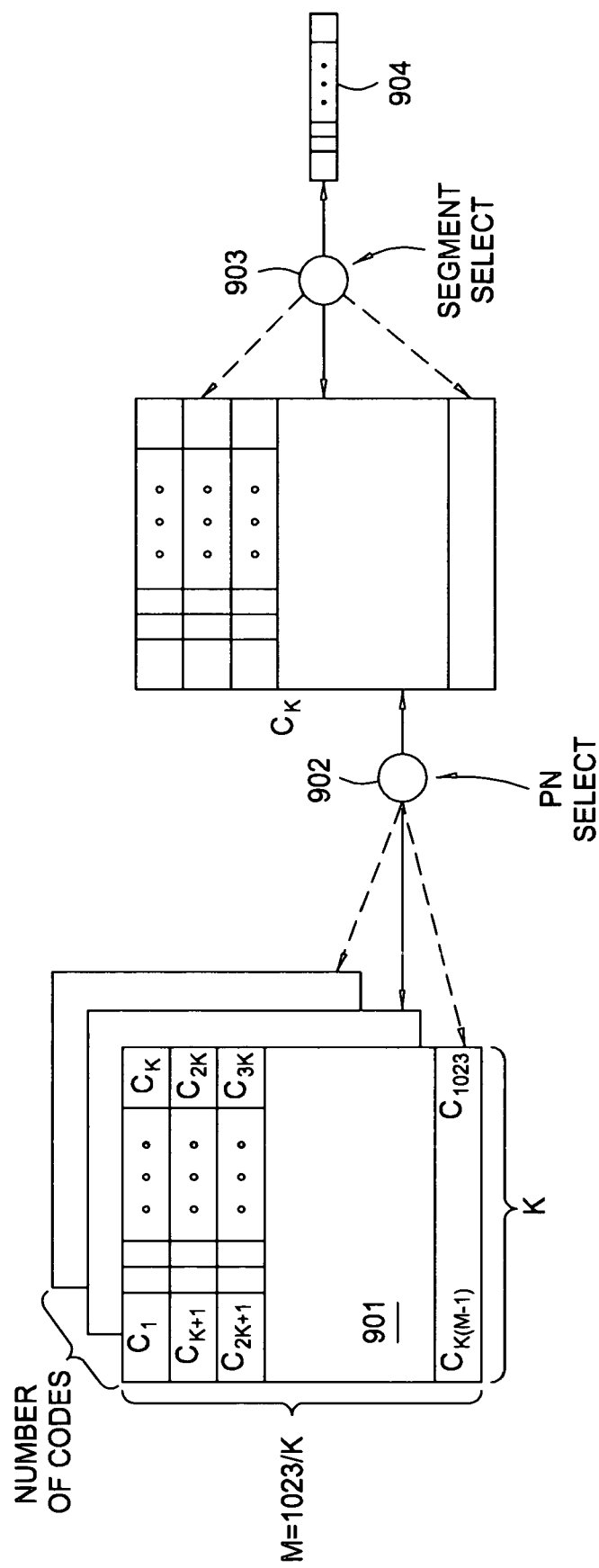
FIG. 9 illustrates an embodiment of a code lookup apparatus suitable for use in the invention of FIG. 3.

FIG. 9 shows a block diagram of one embodiment of a code lookup circuit 508. Table 901 contains stored values for all 1023 bits of each of 32 codes plus 4092 bits of each of the Galileo codes (L1B or L1C). Since the Galileo codes are not predefined, the codes must be loaded into the circuit 508. As such, circuit 508 may be a random access memory. The table 901 is organized as a number of sub-tables, one for each code Each sub-table is further organized as M segments of length K where K×M=1023 (or 4092), and K and M are chosen as described previously. Multiplexer 902 selects a particular code based on a select value. The output of multiplexer 902 is a particular sub-table for the desired code. Multiplexer 903 selects a particular segment based on a segment select value between 1 and M. The output of 903 is a particular code segment 904, of length K, which contains code bits provided to code extender 509.

It should be noted that multiplexer 903 must be high speed in order to allow the code segment to be changed each partial correlation, i.e. every clock cycle. For this reason, it is necessary that all code bits be pre-stored in table 901, as opposed to being generated on the fly in the traditional manner of a GPS code generator.

The circuits of FIG. 9 are intended to be illustrative. In practice, there are many different circuit designs that are functionally equivalent. In particular, the process of logic synthesis used in modern ASIC design will lead to a certain pattern of gates that achieves a behavior equivalent to that described above but not necessarily using multiplexers in the manner described.

Figure 10:
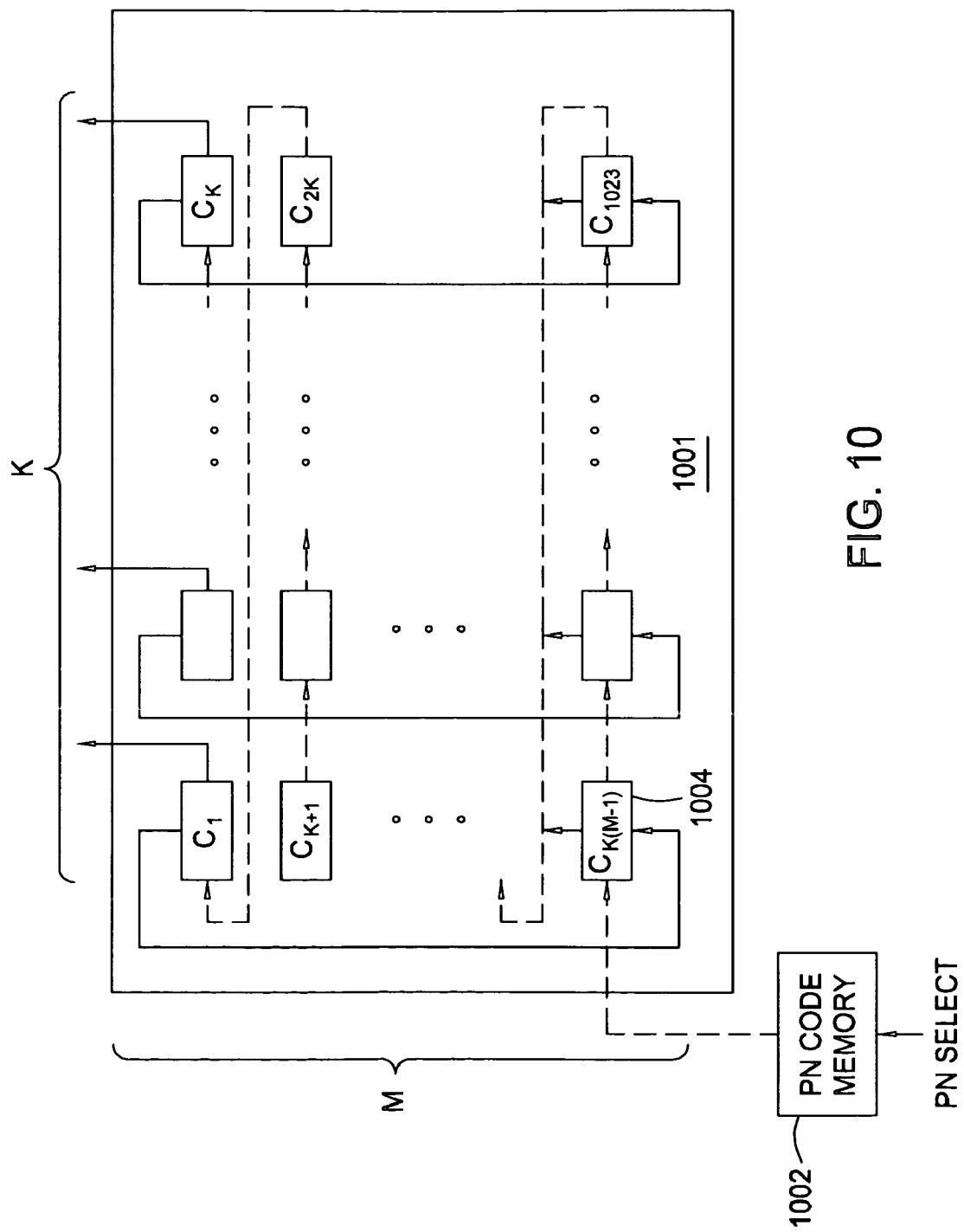
FIG. 10 illustrates an embodiment of a two-dimensional code shift register suitable for use in an alternate embodiment of the invention of FIG. 3.

FIG. 10 shows a block diagram of an alternate embodiment of a code lookup circuit 508. The 1023 (or 4092) code bits corresponding to a particular code are held in 1023 (or 4092) dual-directional shift registers 1001, organized as M rows of length K. The shift registers operate in two modes: a running mode, and a loading mode. Generally, two sets of 4092 shift registers are used to simultaneously accommodate both Galileo L1B and L1C codes. When a Galileo signal is being processed, the shift registers are fully loaded and, when a GPS signal is being processed, only 1023 of the registers are filled. Alternatively, for GPS signals, all 4092 registers are filled using four codes.

In the running mode, each register 1001 is configured to shift its sample to the register above it in the next row, except for the top row of registers that shifts to the bottom row of registers. The shift directions for running mode are indicated by solid arrows within 1001. By clocking all the registers, rows of code bits will circulate, such that at any one time the top row contains one of M code segments of length K. This top row of bits is provided to code extender 509. The registers circulate rapidly, so that a different code segment is made available for each partial correlation.

In the loading mode, each register is configured to shift its sample to the register next in its row, except for the last column of registers, which shift to the first column of registers in the row above. The shift directions for loading mode are indicated by dotted arrows within 1001. The left-hand lower shift register 1004 is connected to code memory 1002, typically flash memory. The code memory stores the 1023 GPS code bits for each of the 32 codes and 4092 Galileo code bits for each of the L1B and L1C codes. When the code lookup circuit 508 is configured for a particular code, the registers are placed in the loading mode, and the memory is accessed to provide the bits of the code, which then clock through the registers. After all bits have been clocked through, the code will reside in the registers as M segments of length K. The circuit is then ready for use in the running mode.

An alternative to using a shift register is RAM that stores all the necessary GPS and Galileo codes. The RAM is addressed to select code segments to apply to the vector multipliers 502a and 502b.

Figure 11:
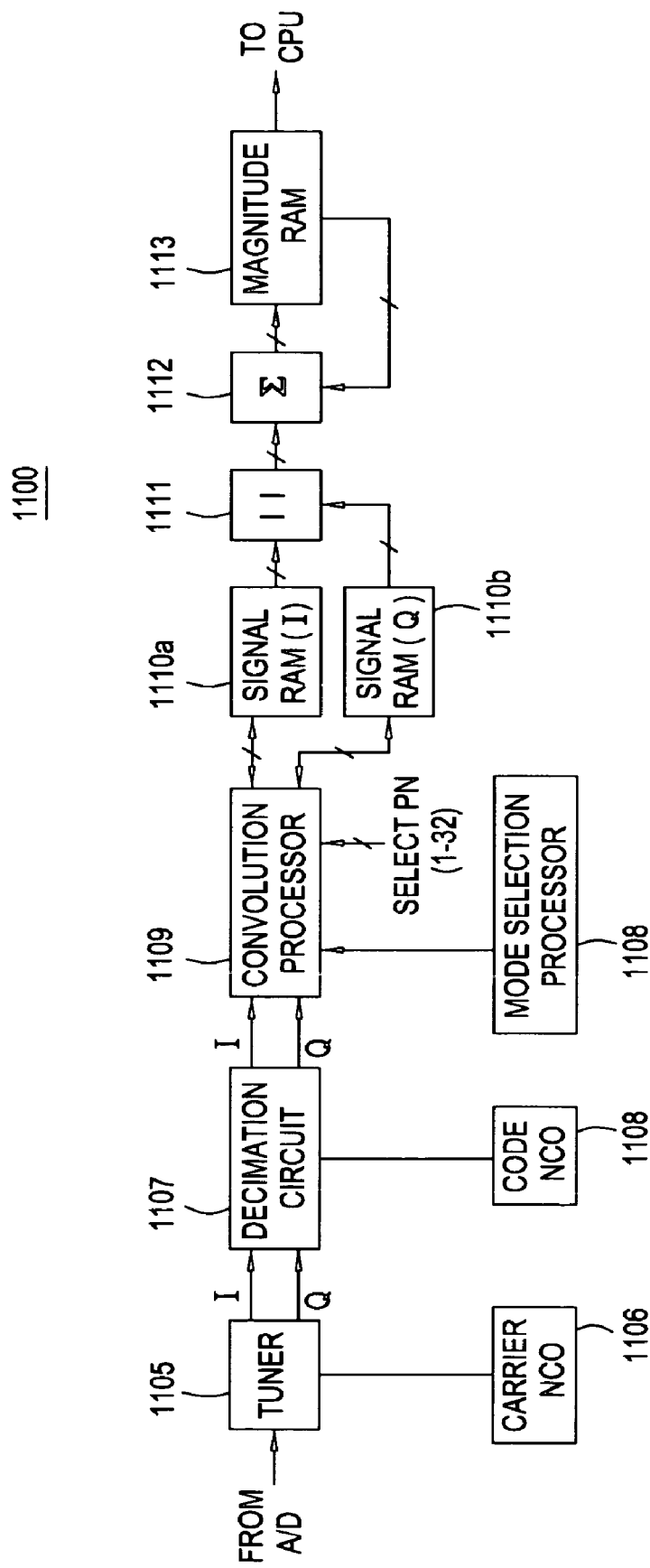
FIG. 11 shows a block diagram of a GNSS receiver comprising an alternative embodiment of the invention.

FIG. 11 depicts a block diagram of an alternative embodiment of a GNSS receiver 1100 capable of operating in multiple modes of resolution. The GNSS receiver 1100 has a convolution processor 1109 that operates either in a standard resolution mode or a high-resolution mode. Moreover, digital signal samples in standard resolution mode are spaced ½ of a PRN code chip apart (i.e., P=2). Digital signal samples in the high-resolution mode are spaced ⅕ of a PRN code chip apart (i.e., P=5). As such, the Code NCO 1108 and the decimation circuit 1107 operate at a plurality of sampling rates. Those skilled in the art can readily devise other values for the sample spacing and understand that the invention can operate in more than two modes of resolution.

The embodiments of FIG. 11 have similar components as those depicted in FIG. 3. Components having the same reference number as those in FIG. 3 operate as described above with respect to FIG. 3. Components such as decimation circuit 1107, Code NCO 1108, convolution processor 1109 and mode selection processor 1102 operate as described below to facilitate the use of a plurality of resolution modes. FIG. 11 further comprises a mode selection processor 1102. The mode selection processor 1102 processes received signals to determine whether the processing channel 1104 should operate in the high or standard resolution mode.

It should be noted that in standard resolution (i.e., P=2), the least square estimation uses only 4 points over the width of the correlation. In the presence of noise, this limits the accuracy of the curve fitting process. Furthermore, in many cases the center of the triangle (i.e., the point of maximum correlation in an ACF) will reside between the observed correlation values. In this situation, the observed correlation, and hence the observed signal to noise ratio, is significantly lower than the case where the peak of the triangle is close to an observed point. The high-resolution mode improves accuracy and signal to noise ratio by including many, finely spaced points in the least squares estimation process.

Figure 12:
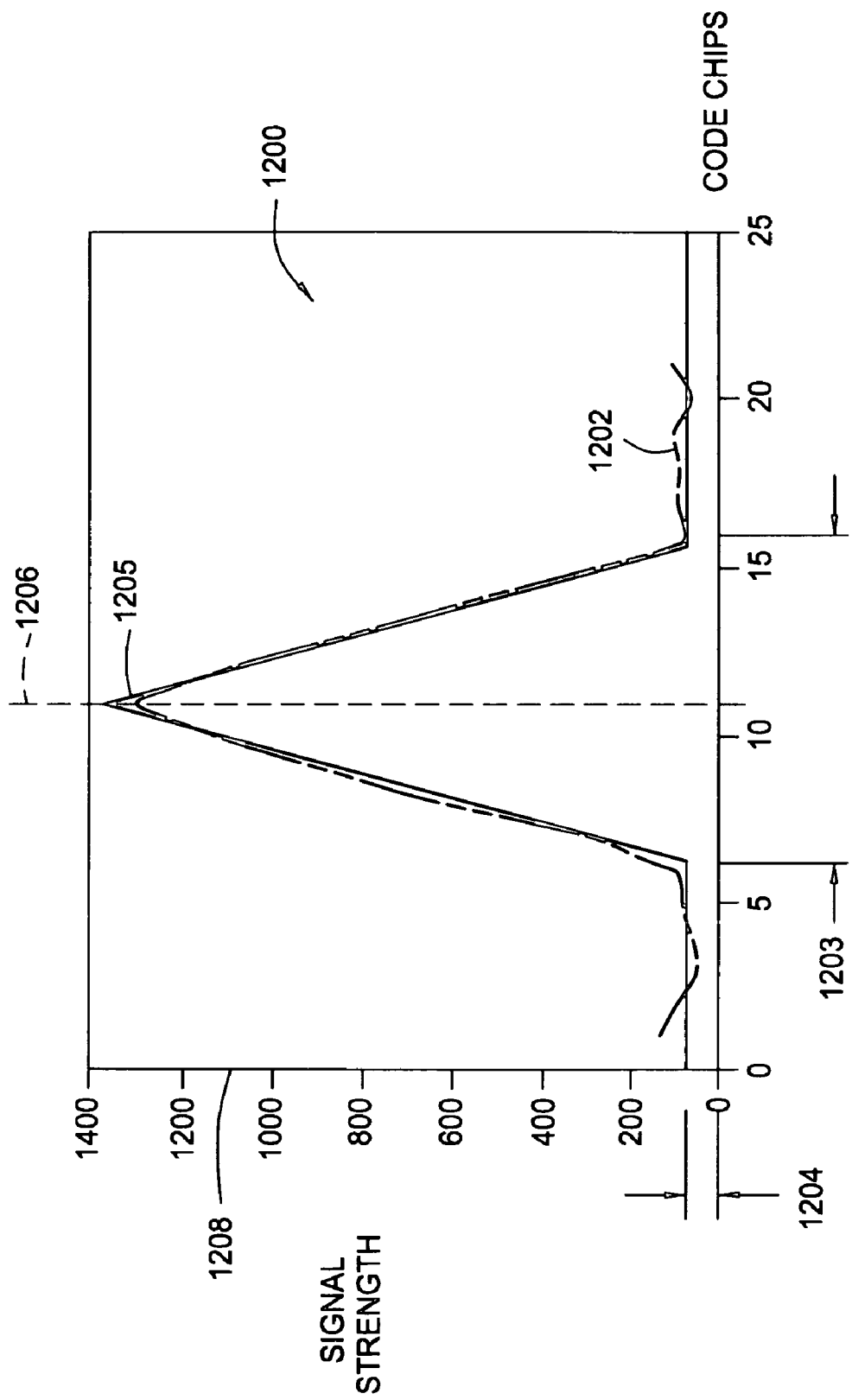
FIG. 12 shows details of an accumulated magnitude waveform in high resolution mode.

Specifically, FIG. 12 shows the details of an accumulated magnitude waveform in high-resolution mode of a GPS signal or a filtered Galileo signal. For an unfiltered Galileo signal, the peak is narrower, but the concepts discussed below are the same. The graph 1200 shows the magnitude of the convolution (axis 1208) in the vicinity of a peak corresponding to the time delay of the signal processed in high-resolution mode. Points on the code chip axis 1210 are spaced at an interval equal to the PRN code chip length divided by P, where P is the ratio of the signal-sampling rate to $f_o$, the PRN code chipping rate. In the high-resolution example, P=5, so the points are spaced at ⅕ chip intervals, or approximately 200 ns. (This spacing in time corresponds to a range difference of approximately 60 meters). In order to achieve high accuracy pseudorange measurements, the output of the convolution is further processed, typically in the CPU 314.

As with standard resolution processing, there are numerous interpolation techniques that can be used to estimate the true time delay, using discrete correlation values provided by the convolution. One embodiment uses a least squares estimation technique to identify parameters of a signal that best fits the noisy data. The correlation response takes on the form of a raised triangle 1202. The width 1203 of the triangle 1202 is exactly 2 PRN code chips, which corresponds to 11 sample points (for the P=5 case). The height 1204 of the base of the triangle 1202 is the magnitude of the noise in the convolution for time delays not corresponding to the signal. The magnitude of this noise can be estimated from the data or pre-calculated based on design parameters, such as the amplifier noise figure, cable and filter loss, and system temperature. The peak 1205 of the triangle 1202 and the center 1206 are unknowns corresponding to the signal magnitude and time delay. The least squares method can be used to estimate these two parameters so as to fit the noisy data points to a triangle with a particular peak and center.

One benefit of the high-resolution mode over the standard resolution mode is that the raised triangle correlation response is sampled at more than twice as many points. As understood by those skilled in the art, the accuracy of the fitting process depends on the number of values used in the estimation. Furthermore, the ratio of the peak of the triangle to the base of the triangle is increased in high-resolution mode. This indicates an improvement in signal to noise ratio, due in part to correlation points being available close to the point of maximum correlation. Thus, high-resolution mode can be used to reliably identify and measure correlation peaks that may not be properly discernable in standard mode. This can be very advantageous when processing low energy signals, such as those signals received indoors from SPS satellites.

As will be described further with regard to FIG. 13, the two modes of operation are achieved by dynamically changing the values of the parameters P, K, and M to obtain the desired resolution. In one embodiment, P=2 (i.e., two samples per PRN code chip) in standard mode and P=5 (i.e., five samples per PRN code chip) in high-resolution mode. The completed correlation points are spaces at 1/P chips apart, thus it is clear that the larger the value of P, the finer the resolution. As discussed above, K is chosen as a design parameter and is a factor of 1023. For simplicity, the remainder of the discussion focuses on one particular embodiment where P=2 and K=33 in standard mode; and P=5 and K=11 in high-resolution mode.

Since P=5 is not evenly divided by 2, when processing an unfiltered Galileo signal, the sampling signal use 3 normal samples and 2 inverted samples on a first chip, then 2 normal samples and 3 inverted samples on a second chip, and then repeat for each successive chip. Alternatively, P=6 could be used for sampling unfiltered Galileo signals in a high resolution mode such that alternating normal and inverted samples could be used on all chips. Of course, if the Galileo signal is filtered to create a BPSK-like signal, then normal sampling is used throughout the signal.

Figure 13:
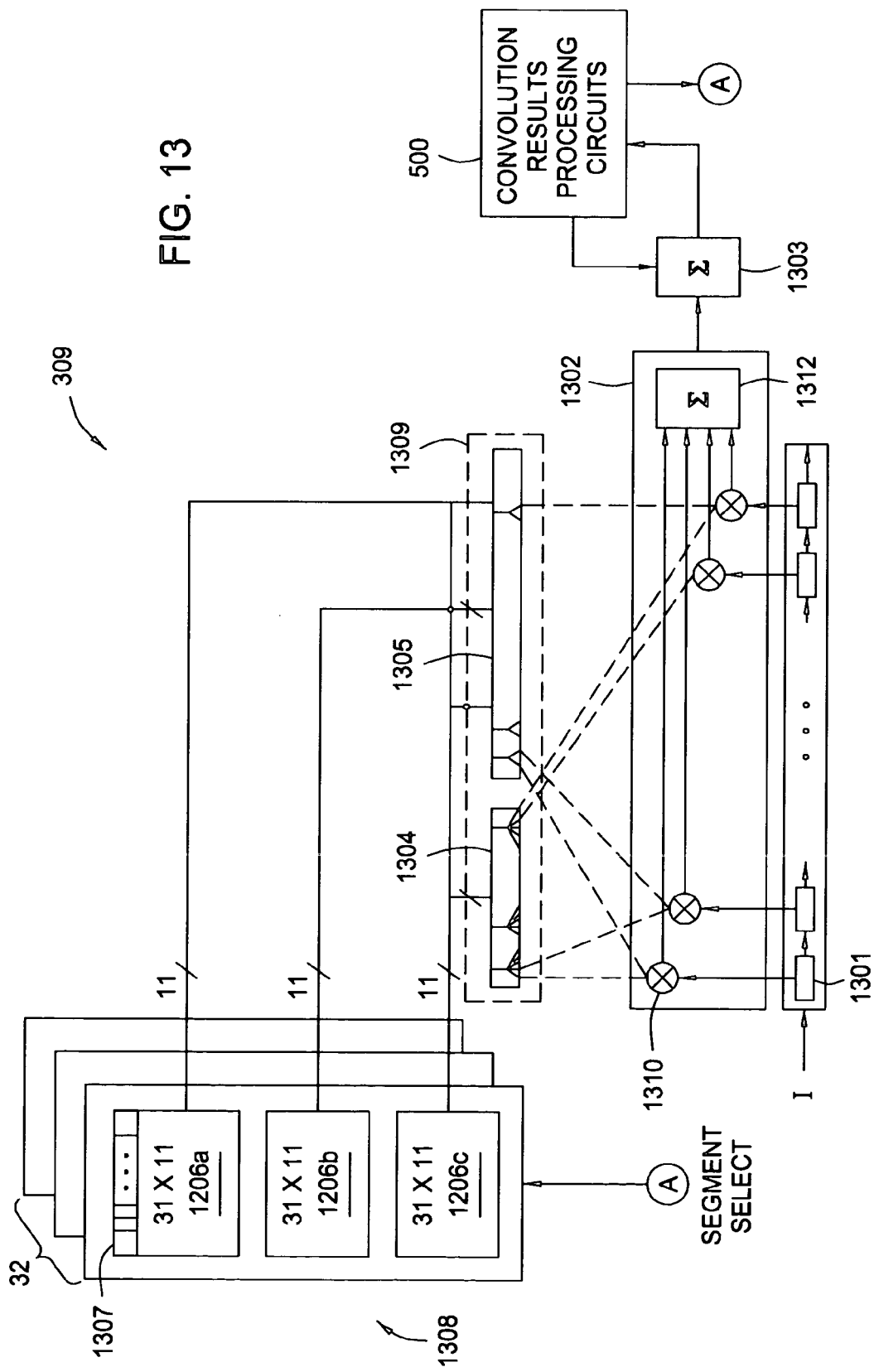
FIG. 13 illustrates an embodiment of a code lookup apparatus suitable for use in the invention of FIG. 11.

FIG. 13 illustrates a block diagram of another embodiment of a convolution processor 1109 suitable for operation of the invention in multiple modes of resolution. For simplicity, only the I channel of processing is shown, but it is clear that the Q channel comprises identical processing elements. In the present embodiment, the convolution processor 1109 comprises a shift register 1301, a vector multiplier circuit 1302, an adder 1303, a code extender 1309, and a code lookup table 1308. The code extender 1309 further comprises a standard code extender 1304 and a high-resolution code extender 1305. The I signal from the decimation circuit 1107 is coupled to the shift register 1301. Shift register 1301 is of variable length since the value of P×K changes with regard to standard and high-resolution modes. Specifically, shift register 1301 must hold 66 samples in standard mode and 55 samples in high-resolution mode. Thus, shift-register 1301 comprises 66 elements to support both lengths. In high-resolution mode, the last 11 elements are disabled.

Signals advance through shift register 1301 at the rate of $Pf_o$ as timed by the code NCO 1108 for either standard mode or high-resolution mode. The signals remain in place for many clock cycles so that a series of partial correlation operations can be performed. Specifically, a total of M partial correlations are performed, where M=1023/K. For the present example, in standard mode, M=31, and in high-resolution mode, M=93. Each partial correlation consists of a fast vector multiply and add operation between the contents of shift register 1301 and a segment of the code containing P×K code samples. The operation is performed via vector multiplier 1302, which comprises multipliers 1310 and a summer 1312. Similarly to shift register 1301, vector multiplier 1302 is of a variable length to support both standard and high-resolution modes of operation.

The correlation operation consists of multiplying each of the P×K signal samples in shift register 1301 by P×K code samples (formed by extending the code samples with code extender 1309), and summing the results in summer 1312. As discussed above, mathematically, this operation is referred to as the inner product. The results of the vector multiply and add are accumulated by adder 1303 and processed by the convolution results processing circuits 500 in the same manner as discussed above with regard to FIG. 5.

Code lookup table 1308 generates the reference code samples for each partial correlation and is organized to supply code segments for both standard and high-resolution modes. First, the code must be selected from the available GPS or Galileo codes. This selection is constant through the convolution process and is established when the processing channel is configured to correlate for a particular satellite signal. The second index is a segment index between 1 and M. In the present example, the number of samples per segment is 33 in standard mode and 11 in high-resolution mode. To support both modes, the code lookup table 1308 comprises 93 segments 1307 of 11 chips. The 93 segments 1307 are further organized into 3 blocks 1306a-c of 31 segments each. The output of each group 1306a-c (an 11 chip segment) is coupled to the code extender 1309.

In standard mode, the output segment of each group 1306a-c is combined to form a wide segment having 33 chips. Specifically, a segment selection is made between 1 and 31. The segment selection and the code selection are used to multiplex 3 segments 1307 of 11 samples from groups 1306a-c. The segments 1307 are concatenated to form a 33 sample wide segment, which is the input to the standard code extender 1304. In high-resolution mode, the segment selection runs from 1 to 93. Only one of the segments 1307 is chosen from groups 1306a-c. The 11 sample segments 1307 are then coupled to the high-resolution code extender 1305.

In standard mode, the standard code extender 1304 is active, which extends the 33 sample wide code segments to 66 samples. In high-resolution mode, the high-resolution code extender 1305 is active, which extends the 11 sample code segments to 55 samples. Although the code extender 1309 is shown as comprising a standard code extender 1304 and a high-resolution code extender 1305, it is understood by those skilled in the art that they could be functionally combined into a single code extender 1309.

Clock rates change between standard and high-resolution modes. For example, in standard mode, as discussed with regard to FIG. 5, a clocking rate of approximately 63.5 MHz supports performing a full convolution in real time for the case where P, K, and M are 2, 33, and 31 respectively and two clock cycles are needed per RAM cycle. In the present embodiment, the high-resolution mode parameters P, K, and M are 5, 11, and 93 respectively. Thus the clocking rate to generate the full convolution is:

$$f_{clk} = 5 \times 93 \times 2 \times f_o = 5 \times 93 \times 2 \times 1.023 \text{ MHz} \approx 952 \text{ MHz}$$

Since this rate is difficult to achieve in modern integrated circuit logic, and since the size of the RAMs would grow from 2046 samples to 5115 samples, it may be desirable to generate less than the full convolution when operating in high-resolution mode in order to reduce cost and complexity of the convolution processor 1009.

Therefore, in one embodiment, less than the full convolution is computed in high-resolution mode by reducing the number of partial correlations performed for each shift of the input signals. As will be describe below with regard to FIG. 14, the partial correlations are selected so that points of correlation are generated for a specific region of interest within the full convolution. In this alternative embodiment, the clock rate required is:

$$f_{clk}' = 5 \times L \times 2 \times f_o$$

where L, a number smaller than M, represents the number of partial correlations per input cycle shift. Thus, the total number of correlation points generated is P×K×L. For example, in one embodiment L=12 and P×K×L=660, or about ⅛ of a C/A code epoch. In this example, the clocking rate required is:

$$f_{clk} = 5 \times 12 \times 2 \times 1.023 \text{ MHz} \approx 123 \text{ MHz}$$

a value that is commensurate with the clocking rate in standard mode.

Figure 14:
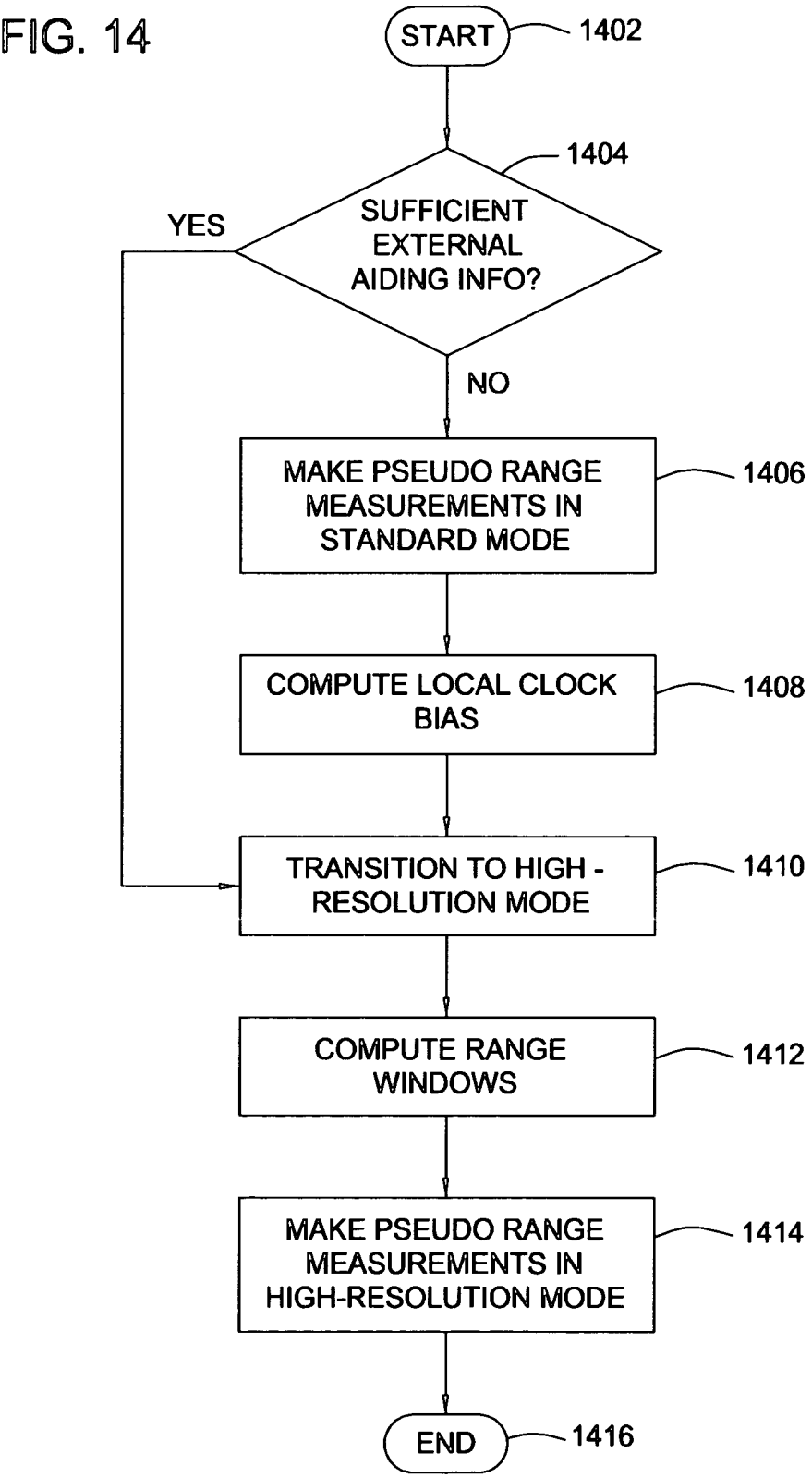
FIG. 14 depicts a flow diagram of a method of operation of the invention of FIG. 11.

Since only a subset of the full convolution is generated, it is necessary to select a portion of interest containing the signal peak. FIG. 14 depicts a flow diagram of a method of operation 1400 of the invention for computing multiple correlation resolutions. The method 1400 begins at step 1402. At step 1404, checks are made to determine whether sufficient external aiding information exists that enables direct use of high-resolution mode. This aiding information could take several forms, including estimated pseudoranges for satellites of interest and an estimate of local clock bias. If the aiding information is sufficiently accurate, the method transitions to high-resolution mode at step 1410. Often times, however, the local clock bias is unknown. For example, estimated pseudoranges may be available from stored ephemeris and a last known receiver position, but, unless the receiver maintains precise timekeeping or is externally synchronized, the local clock bias will be unknown. If there is not sufficient external aiding information, pseudorange measurements are made in standard mode at step 1406. At step 1406, a full convolution is obtained using a standard resolution. After one or more measurements are made in standard mode, the local clock bias is estimated at step 1408. This step optionally includes an estimation of time tag error. The method 1400 then transitions into high-resolution mode at step 1410. At this point, the signal delays can be bounded to a plurality of windows bracketing the correlation peaks at the standard resolution, which is computed at step 1412. After the range windows are computed, the method 1400 makes pseudorange measurements in the high-resolution mode (i.e., using the high resolution correlation peaks) at step 1414. The method 1400 ends at step 1416.

When processing Galileo signals, the high definition made can be used to switch to using an unfiltered Galileo signal, using both data and pilot components and the like. Since Galileo signals provide a number of different signal options for correlation, once an estimate of time is known and the high definition mode can be invoked, more signal processing can be used on additional signal components. By acquiring using USB only (or LSB only) at a 3dB signal reduction, large segments (or all) of the Galileo code can be correlated using the L1C sub-channel. Once timing is acquired from only processing L1C USB signals (or L1C LSB signals), then a portion of the code near that timing estimate may be processed at standard or high resolution using the filtered L1B sub-channel, or the unfiltered Galileo signal for L1B and/or L1C.

The method 1400 allows the high-resolution mode to be used beneficially notwithstanding the constraint that only a partial convolution is computed. As long as at least one GPS or Galileo satellite is detected in standard mode, high-resolution mode can be invoked for all subsequent satellite signal acquisitions. In high-resolution mode, the sensitivity of the correlation processing is enhanced, which enables additional satellites to be detected. Furthermore, as described above, the accuracy of all measurements is improved in high-resolution mode.

Although various embodiments which incorporate the teachings of the present invention have been shown and described in detail herein, those skilled in the art can readily devise many other varied embodiments that still incorporate these teachings.

The invention claimed is:

1. Apparatus for processing signals from a plurality of satellite systems comprising:
   a tuner operable to select a first signal from a satellite in a first satellite system or a second signal from a satellite in a second satellite system;
   a single sideband filter operable to filter the first signal;
   a decimation circuit operable to subsample the filtered first signal or the second signal, wherein a subsample spacing is selectable; and
   a convolution processor operable to correlate the subsampled signal with a selected portion of a reference code to produce at least one partial correlation and accumulate the at least one partial correlation to produce a full convolution.

2. The apparatus of claim 1, wherein the first satellite system is a Galileo system.

3. The apparatus of claim 1, wherein the first satellite system is a Global Positioning System.

4. The apparatus of claim 1, wherein the tuner comprises a quadrature tuner operable to generate an in-phase component and a quadrature-phase component of the first signal or the second signal.

5. The apparatus of claim 1, wherein the convolution processor comprises a partial correlator operable to correlate portions of the filtered first signal or the second signal.

6. The apparatus of claim 1, wherein the decimation circuit uses a first sample spacing during a first mode and a second sample spacing during a second mode, where the first sample spacing is larger than the second sample spacing.

7. The apparatus of claim 1, wherein the first filtered signal comprises at least one of an upper sideband signal and a lower sideband signal.

8. The apparatus of claim 1, wherein the convolution processor comprises a correlation circuit operable to correlate at least one of a pilot component and a data component of the filtered first signal.

9. A method for computing correlations of a digital signal with a pseudorandom reference code comprising:
   receiving at least one of either a first signal from a first satellite system or a second signal from a second satellite system, where said first signal has additional coding;
   single sideband filtering the first signal to create a filtered first signal;

correlating the filtered first signal or the second signal with a pseudo-random reference code to produce first partial correlations;

accumulating the first partial correlations to generate a full convolution;

using the full convolution to establish timing and frequency synchronization dividing the pseudorandom reference code into a plurality of code segments;

selecting a code segment;

forming an inner product between the selected code segment and the first signal or the second signal to produce a second partial correlation, wherein the additional coding is removed from the first signal before the inner product is formed;

repeating the selecting and forming steps to produce a plurality of second partial correlations; and summing the plurality of second partial correlations to form a plurality of second correlations.

10. The method of claim 9, wherein the first signal is a satellite signal from a Galileo satellite and the second signal is a satellite signal from a GPS satellite.

11. The method of claim 9, wherein the additional coding is a binary offset carrier code.

12. The method of claim 9, wherein the receiving step comprises selecting a first or second sample spacing for the first signal or the second signal, where the first sample spacing is greater than the second sample spacing.

13. The method of claim 9, wherein the filtering step generates at least one of an upper sideband signal and a lower sideband signal.

14. The method of claim 9, wherein the correlating step comprises correlating at least one of a data component or a pilot component of the filtered first signal.

15. Apparatus for processing signals from a plurality of satellite systems comprising:
a tuner operable to select a first signal from a satellite in a first satellite system or a second signal from a satellite in a second satellite system;
a single sideband filter operable to filter the first signal;
a decimation circuit operable to subsample the filtered first signal or the second signal, wherein a subsample spacing is selectable; and
a convolution processor operable to correlate the subsampled signal with a reference code to produce a full convolution.

16. The apparatus of claim 15, wherein the first satellite system is a Galileo system and the second satellite system is a Global Positioning System.

17. The apparatus of claim 15, wherein the convolution processor comprises a partial correlator for correlating portions of the filtered first signal or the second signal.

18. The apparatus of claim 15, wherein the apparatus comprises a synchronization processor operable to establish timing and frequency synchronization.

19. The apparatus of claim 15, wherein the tuner comprises a quadrature tuner operable to generate an in-phase component and a quadrature-phase component of a signal.

20. The apparatus of claim 15, wherein the decimation circuit uses a first sample spacing during a first mode and a second sample spacing during a second mode, where the first sample spacing is larger than the second sample spacing.

* * * * *

UNITED STATES PATENT AND TRADEMARK OFFICE
CERTIFICATE OF CORRECTION

| | | |
|---|---|---|
| PATENT NO. | : 8,149,897 B2 | |
| APPLICATION NO. | : 11/441798 | |
| DATED | : April 3, 2012 | |
| INVENTOR(S) | : Charles Abraham | |

It is certified that error appears in the above-identified patent and that said Letters Patent is hereby corrected as shown below:

Column 21
Line 2, Claim 9, please replace "pseudo-random" with --pseudorandom--.

Signed and Sealed this
Thirtieth Day of October, 2012

David J. Kappos
*Director of the United States Patent and Trademark Office*